(12) United States Patent
Lopez

(10) Patent No.: US 12,094,494 B2
(45) Date of Patent: Sep. 17, 2024

(54) SYSTEM AND METHOD FOR GENERATING AND EDITING A VIDEO

(71) Applicant: Camilo Lopez, Miami, FL (US)

(72) Inventor: Camilo Lopez, Miami, FL (US)

( * ) Notice: Subject to any disclaimer, the term of this patent is extended or adjusted under 35 U.S.C. 154(b) by 160 days.

(21) Appl. No.: 17/971,560

(22) Filed: Oct. 22, 2022

(65) Prior Publication Data

US 2023/0040668 A1 Feb. 9, 2023

Related U.S. Application Data

(63) Continuation-in-part of application No. 17/024,510, filed on Sep. 17, 2020, now Pat. No. 11,567,992.

(51) Int. Cl.
| | | |
|---|---|---|
| *G11B 27/00* | (2006.01) | |
| *G10H 1/36* | (2006.01) | |
| *G11B 27/034* | (2006.01) | |
| *G11B 27/34* | (2006.01) | |
| *H04N 5/76* | (2006.01) | |
| *H04N 23/63* | (2023.01) | |

(52) U.S. Cl.
CPC .............. *G11B 27/34* (2013.01); *G10H 1/368* (2013.01); *G11B 27/034* (2013.01); *H04N 23/633* (2023.01)

(58) Field of Classification Search
USPC .................................................. 386/248, 278
See application file for complete search history.

(56) References Cited

U.S. PATENT DOCUMENTS

| 10,726,630 B1 * | 7/2020 | Duckworth .......... G06V 10/235 |
|---|---|---|
| 2012/0095817 A1 | 4/2012 | Kamil et al. |
| 2013/0182108 A1 | 7/2013 | Meadow et al. |

(Continued)

OTHER PUBLICATIONS

ISR/PCT/US2020/051312; Jan. 27, 2021.
ISR/PCT/US2022/47974; Feb. 1, 2023.

*Primary Examiner* — Nigar Chowdhury
(74) *Attorney, Agent, or Firm* — AKC PATENTS, LLC; Aliki K. Collins

(57) ABSTRACT

The invention provides a system and a computer-implemented method for generating and editing a video including providing a mobile communication device comprising a camera, a display, a central processing unit (CPU), a video generating application and a memory. Next, starting the video generating application, and then opening the camera and providing camera tutorials. The camera tutorials comprise instructions for camera positioning, camera moving, and camera aligning while taking videos. Next, taking videos of a scene following the instructions for camera positioning, camera moving, and camera aligning while taking videos. Next, uploading the videos to the memory, editing the videos and producing a composite video for the scene. The camera tutorials include a "moving forward/backward" tutorial directing a user first to hold the camera still, to align a horizontal view line in the display with a marker line, and then to move the user's body forward or backward while taking a video of the scene. The editing of the videos includes slowing the videos down, and matching rhythm of music accompanying each video to transitions of consecutive videos. The slowing down of the videos includes removing every other frame.

24 Claims, 26 Drawing Sheets

(56) References Cited

U.S. PATENT DOCUMENTS

| | | | |
|---|---|---|---|
| 2014/0204263 A1* | 7/2014 | Lee | H04N 23/611 |
| | | | 348/333.11 |
| 2015/0310523 A1 | 10/2015 | Silvernail | |
| 2017/0134815 A1 | 5/2017 | Lomelino et al. | |
| 2018/0326999 A1* | 11/2018 | Hershkovitz | G06V 40/20 |
| 2020/0105013 A1* | 4/2020 | Chen | G06V 40/166 |
| 2020/0327670 A1* | 10/2020 | Connor | G06T 19/006 |
| 2021/0027510 A1* | 1/2021 | Avoyan | G06T 11/60 |
| 2021/0077904 A1* | 3/2021 | Yen | A63F 13/335 |
| 2021/0081450 A1 | 3/2021 | Lopez | |
| 2021/0127057 A1* | 4/2021 | Varekamp | H04N 23/64 |
| 2022/0084313 A1 | 3/2022 | Li et al. | |

* cited by examiner

SYSTEM AND METHOD FOR GENERATING AND EDITING A VIDEO

CROSS REFERENCE TO RELATED CO-PENDING APPLICATIONS

This application claims the benefit and is a continuation-in-part of U.S. application Ser. No. 17/024,510 filed on Sep. 17, 2020 and entitled SYSTEM AND METHOD FOR GENERATING A VIDEO, which is commonly assigned and the contents of which are expressly incorporated herein by reference.

FIELD OF THE INVENTION

The present invention relates to a system and a method for generating and editing a video and more particularly, to a system and method for capturing a plurality of videos and images of an object with a camera of a mobile communication device, editing them and combining them in order to generate a video.

BACKGROUND OF THE INVENTION

There are several video capturing and editing systems that use a series of steps to capture a plurality of videos and then generate a composite video by joining them together. Mobile phones equipped with high resolution cameras are frequently used for video capturing. Computer-based video editing systems, such as iMovie, allow users to easily join, edit and revise the videos. However, they still require human intervention for each editing decision.

Accordingly, there is still a need for a video capturing and editing system that is easy to use without the need of human intervention.

SUMMARY OF THE INVENTION

The invention provides a system and method for capturing a plurality of videos and images of an object with a camera of a mobile communication device, editing them and combining them in order to generate a video.

In general, in one aspect the invention provides a computer-implemented method for generating and editing a video including the following. First, providing a mobile communication device comprising a camera, a display, a central processing unit (CPU), a video generating application and a memory. Next, starting the video generating application, and then opening the camera and providing camera tutorials. The camera tutorials comprise instructions for camera positioning, camera moving, and camera aligning while taking videos. Next, taking videos of a scene following the instructions for camera positioning, camera moving, and camera aligning while taking videos. Next, uploading the videos to the memory, editing the videos and producing a composite video for the scene. The camera tutorials including a "moving forward/backward" tutorial directing a user first to hold the camera still, to align a horizontal view line in the display with a marker line, and then to move the user's body forward or backward while taking a video of the scene. The editing of the videos includes slowing the videos down, and matching rhythm of music accompanying each video to transitions of consecutive videos.

Implementations of this aspect of the invention include the following. The slowing down of the videos includes removing every other frame. The camera aligning includes aligning a horizontal view line with a marker line, and wherein the marker line changes color upon achieving alignment of the camera. The camera tutorials further include a "push in/push out" tutorial directing a user first to stand still with the user's left leg positioned forward in front of the scene, to hold the camera still, to align a horizontal view line in the display with a marker line, and then to put all the user's weight on the left front leg and to move the user's body forward (push-in) or backward (push-out) while taking a video of the scene. The camera tutorials further include a "reveal/slide" tutorial directing a user first to stand still with feet sidewise apart in front of the scene, to hold the camera still, to align a horizontal view line in the display with a marker line, and then to move the user's body linearly sidewise left to right (or right to left) while taking a video of the scene. The camera tutorials further include a "rotational" tutorial directing a user first to stand still with feet sidewise apart in front of the scene, to hold the camera still, to align a horizontal view line in the display with a marker line, and then to rotate the user's body left to right (or right to left) while taking a video of the scene. The method further includes entering section information for each scene, selecting specific music to accompany each video of each scene, taking videos of each scene and arranging the videos of each scene in a custom order. The method further includes previewing the videos of the scene and accepting them or retaking them. The editing of the videos further comprises stabilizing the videos by removing a small percentage of all four corners of each video. The editing of the videos further comprises performing quality control of the videos and wherein the quality control comprises one of color correction, lighting adjustment, size adjustment, orientation adjustment, removal of unwanted images and structures, video start and stop adjustment, position adjustment of each video in the composite video of the scene, changing of logos, manually exporting and importing of videos, automatically exporting various versions of the composite video of the scene, adding a title to each version of the composite video of the scene, and saving the edited versions of the composite video of the scene. The method further includes entering one or more of a company logo, company name, company image, and company contact information. The mobile communication device comprises one of a tablet, a digital camera, a mobile phone, a laptop computer, a drone or any other computing device with a camera.

In general, in another aspect the invention provides a system for generating and editing a video including a mobile communication device comprising a camera, a display, a central processing unit (CPU), a video generating and editing application and a memory. The mobile communication device is configured to connect to a video application server, an online data storage device, an authentication server and a global mapping server via a network connection. The video generating application is configured to provide a user interface via the display and comprises computer implemented instructions for opening the camera and providing camera tutorials, wherein the camera tutorials comprise instructions for camera positioning, camera moving, and camera aligning while taking videos. The video generating application further comprises computer implemented instructions for taking videos of a scene according to the instructions of the camera tutorials. The video generating application further comprises computer implemented instructions for uploading the videos to the memory, editing the videos and producing a composite video for scene. The camera tutorials includes a "moving forward/backward" tutorial directing a user first to hold the camera still, to align a horizontal view line in the display with a marker line, and then to move the user's body forward or backward while taking a video of the scene.

The editing of the videos includes slowing the videos down, and matching rhythm of music accompanying each video to transitions of consecutive videos. The mobile communication device comprises one of a tablet, a digital camera, a mobile phone, a laptop computer, a drone, or any other computing device with a camera.

The details of one or more embodiments of the invention are set forth in the accompanying drawings and description below. Other features, objects, and advantages of the invention will be apparent from the following description of the preferred embodiments, the drawings and from the claims.

BRIEF DESCRIPTION OF THE DRAWINGS

Referring to the figures, wherein like numerals represent like parts throughout the several views:

FIG. 7C depicts a screen shot of the user interface for taking a video shot with the stabilization feature on;

DETAILED DESCRIPTION OF THE INVENTION

The invention provides a system and method for capturing a plurality of videos and images of an object with a camera of a mobile communication device, editing them and combining them in order to generate a video. In one embodiment, the invention provides an application for capturing, editing and combining a plurality of videos and images of a real estate structure with a mobile communication device and then generating a real estate video for a specific real estate listing.

Figure 1:
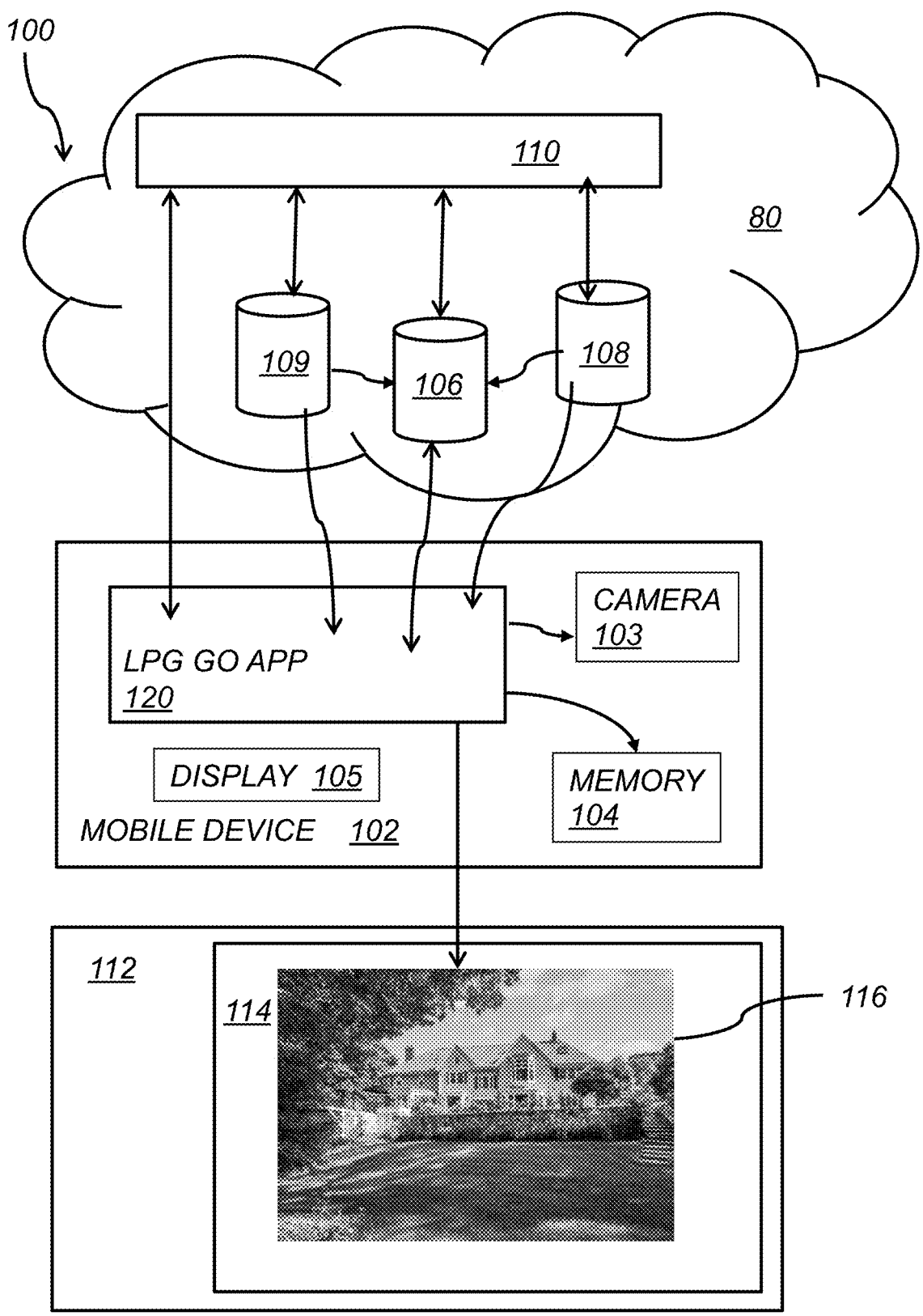
FIG. 1 is a diagrammatic view of a video generating system according to this invention.

Referring to FIG. 1, video generating system 100 according to this invention includes a mobile communication device 102 and a video generating application (LPG GO APP) 120. The mobile communication device 102 includes a camera 103, a display 105, memory 104 and a copy of the video generating application 120 stored in memory 104. The mobile communication device 102 connects via a network connection 80 to a web-server 110 and downloads the video generating application 120. The mobile communication device 102 also connects to an online data storage device 106, an authentication server 108 and a global mapping server 109. In one example, the mobile communication device 102 is a mobile phone (e.g., iPhone™, or Android™), web-server 110 is a server for the Apple Store™, the online data storage device 106 is Dropbox™, the authentication server 108 is an Amazon™ server and the global mapping server 109 is a Google™ maps server. A video 116 generated with the video generating system 100 is viewed via a display 105 of the mobile communication device 102 or via a display 114 in a separate device 112. In other examples, the mobile communication device is a tablet, a digital camera, a mobile phone, a laptop computer, a drone, or any other computing device with a camera. In the embodiment where the mobile communication device is a drone, the drone 112 is programmed to execute an automatic drone flight throughout the surrounding area and real estate property and perform all the steps a human user would do, as described below. The drone 112 is programmed to use various sensors to move through the entire property and capture the necessary clips.

Figure 2:
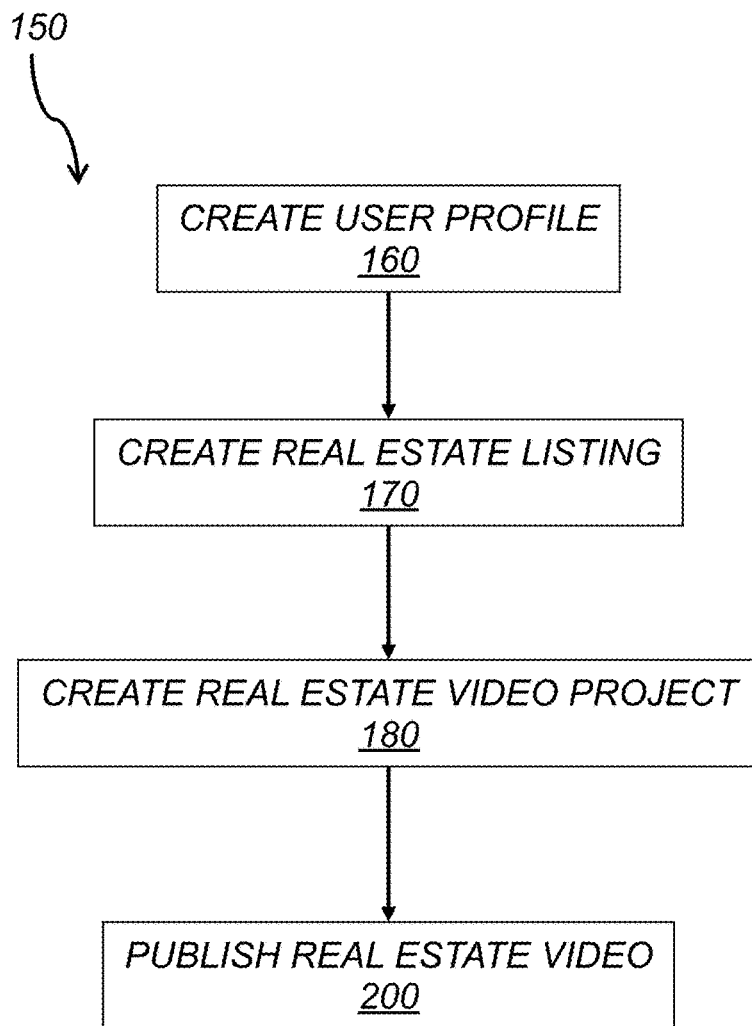
FIG. 2 is a block diagram of the process of generating a video according to this invention.

Referring to FIG. 2, a process 150 for generating a video with the video generating system 100 according to this invention includes the following steps. First, a user logs into the video generating application 120 in the mobile communication device 102 and creates a user profile (160). Next, the user creates a real estate listing (170) and then creates a real estate video project (180). Finally, the user publishes the real estate video (200).

Figure 3A:
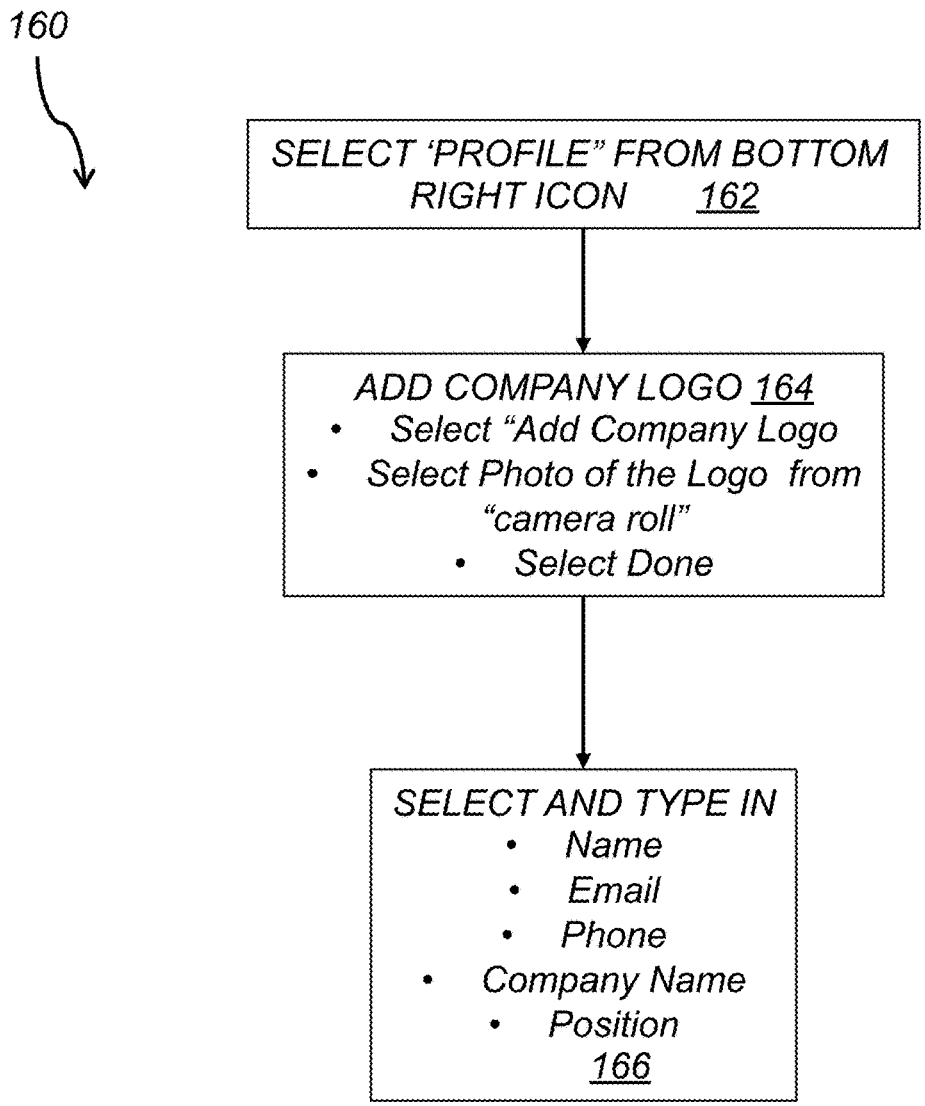
FIG. 3A is a block diagram of the step of creating a profile in the process of FIG. 2.
Figure 3B:
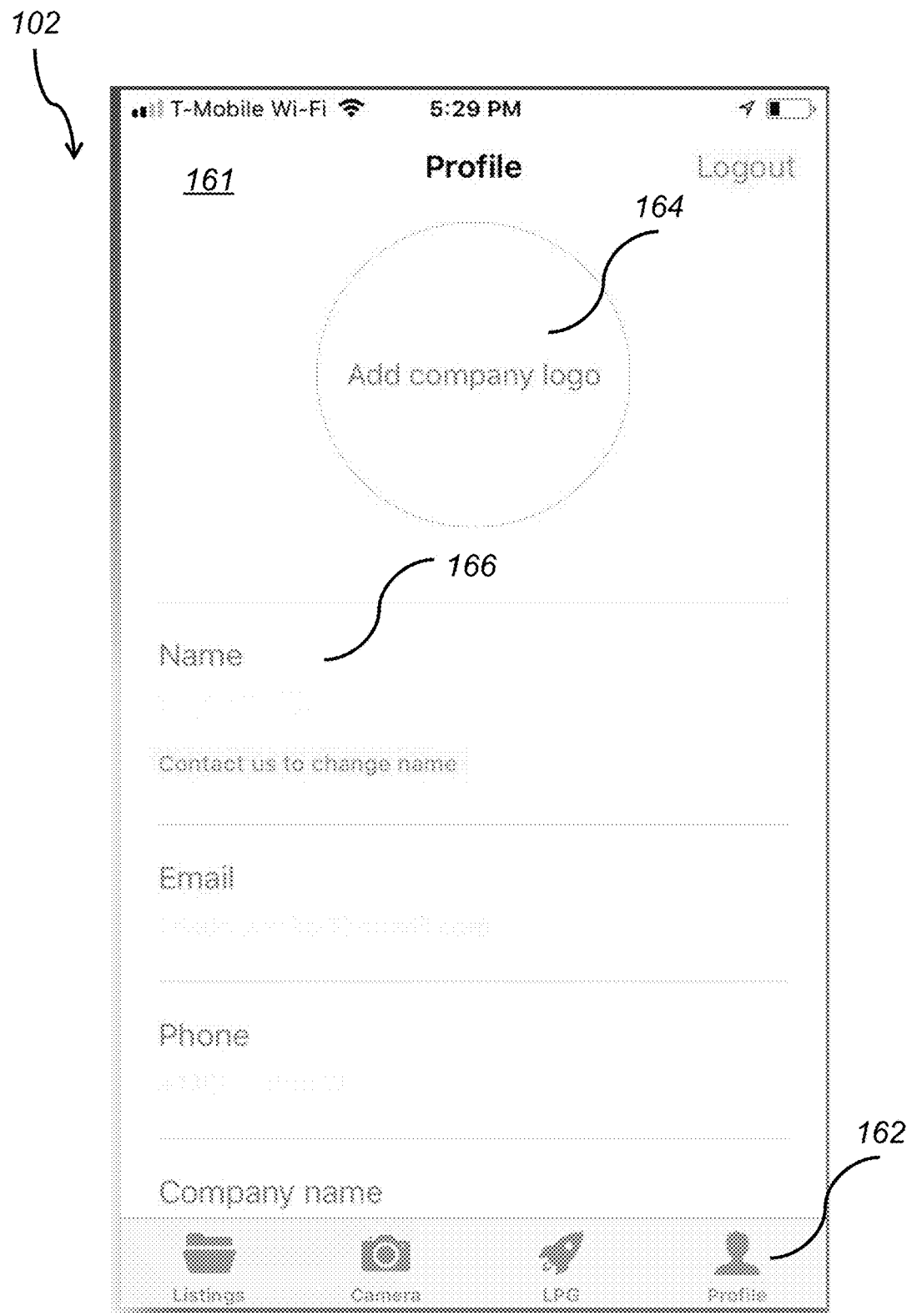
FIG. 3B depicts a screen shot of the user interface for creating a profile in the process of FIG. 2.
Figure 4A:
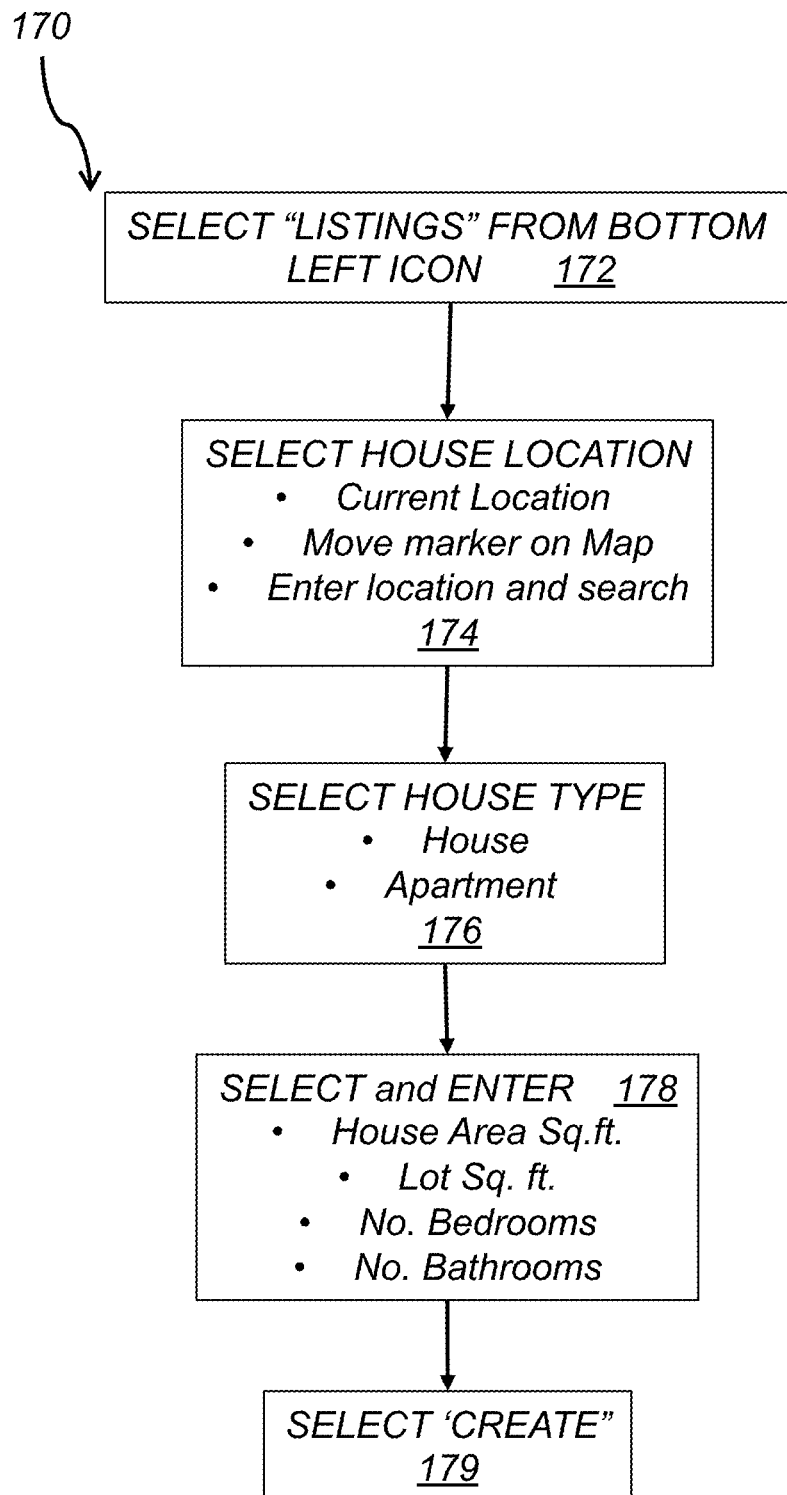
FIG. 4A is a block diagram of the step of creating a real estate listing in the process of FIG. 2.
Figure 4B:
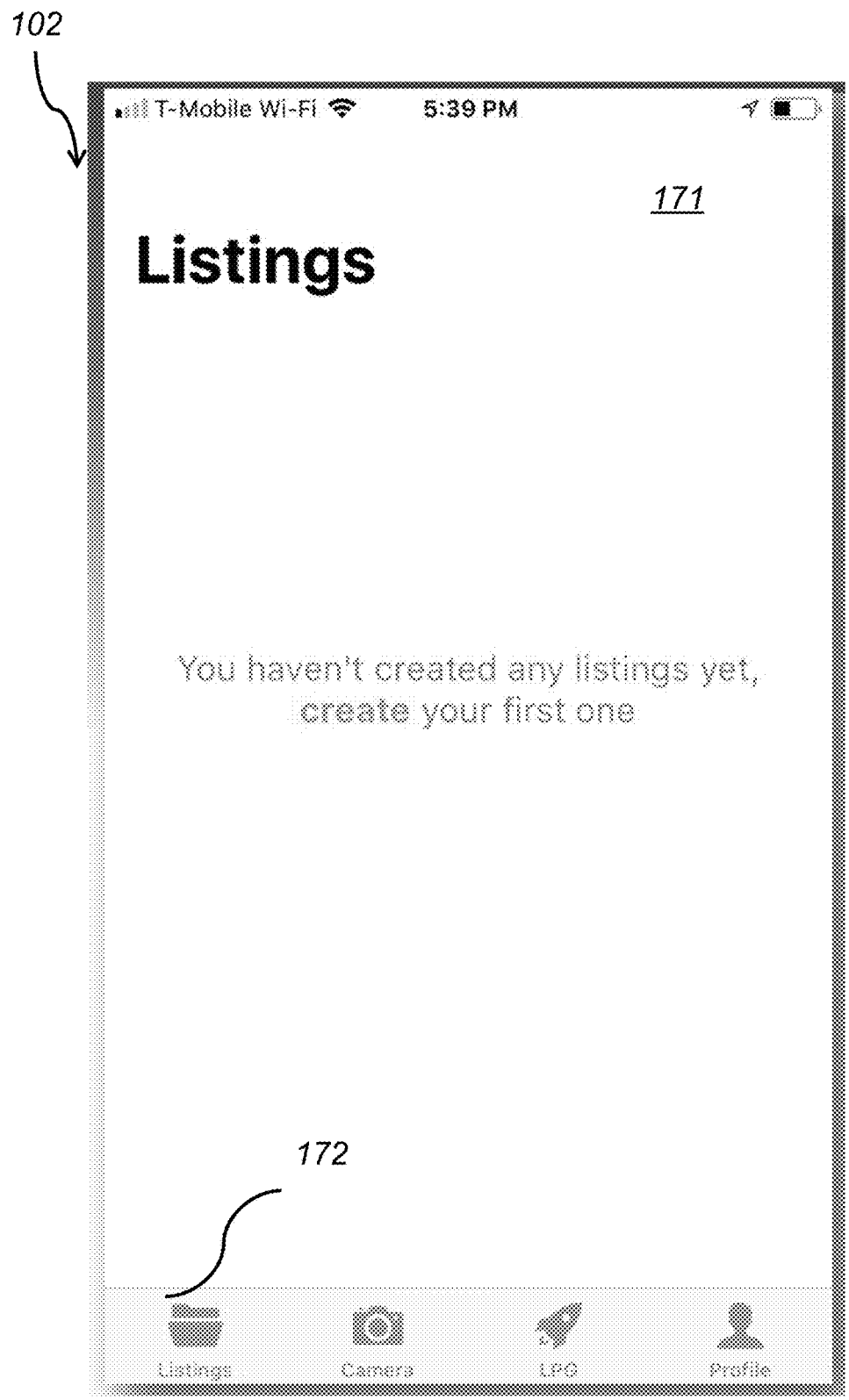
FIG. 4B depicts a screen shot of the user interface for selecting the real estate listing icon in the step of FIG. 4A.
Figure 4C:
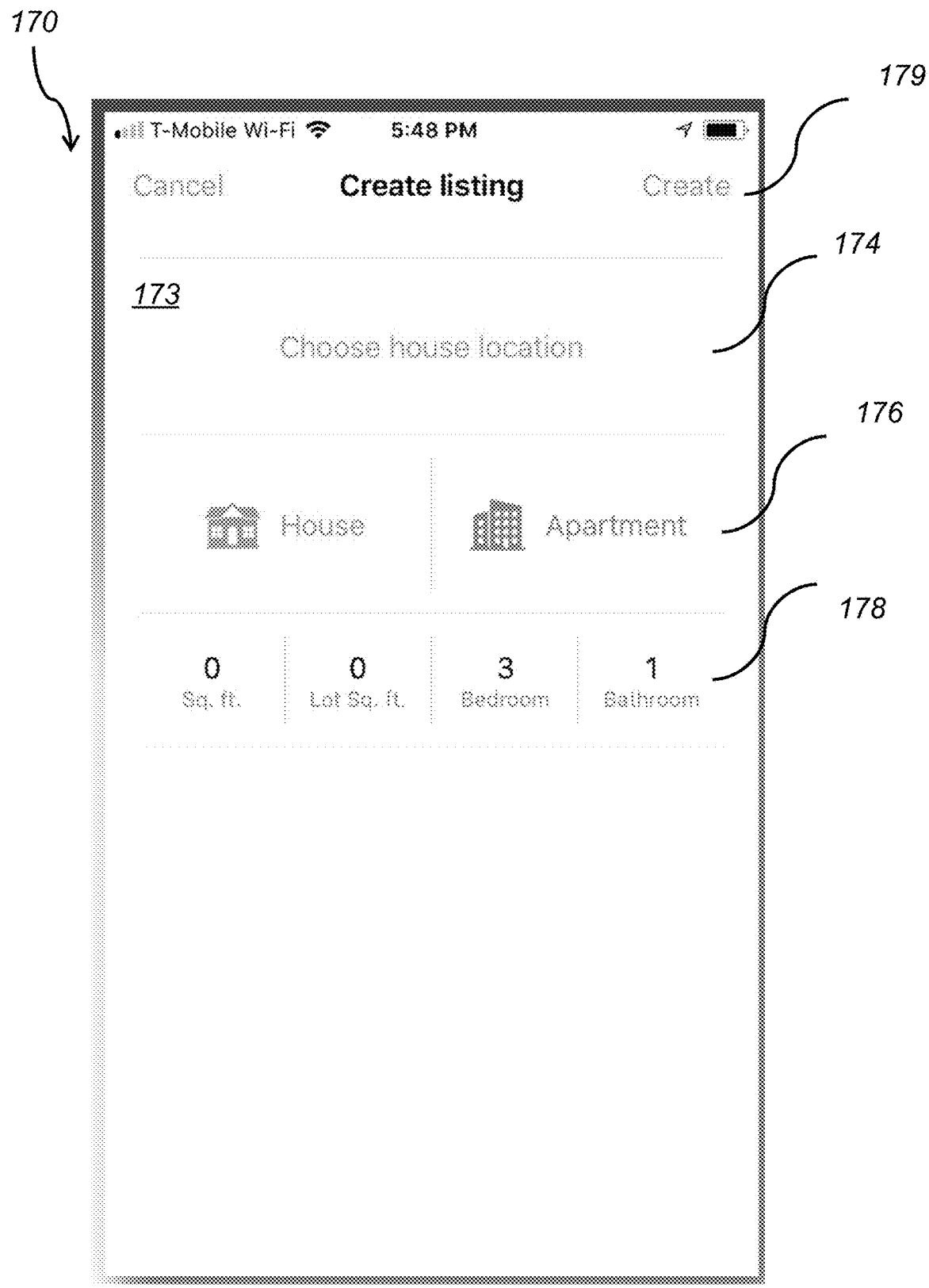
FIG. 4C depicts a screen shot of the user interface for creating a real estate listing in the step of FIG. 4A.
Figure 4D:
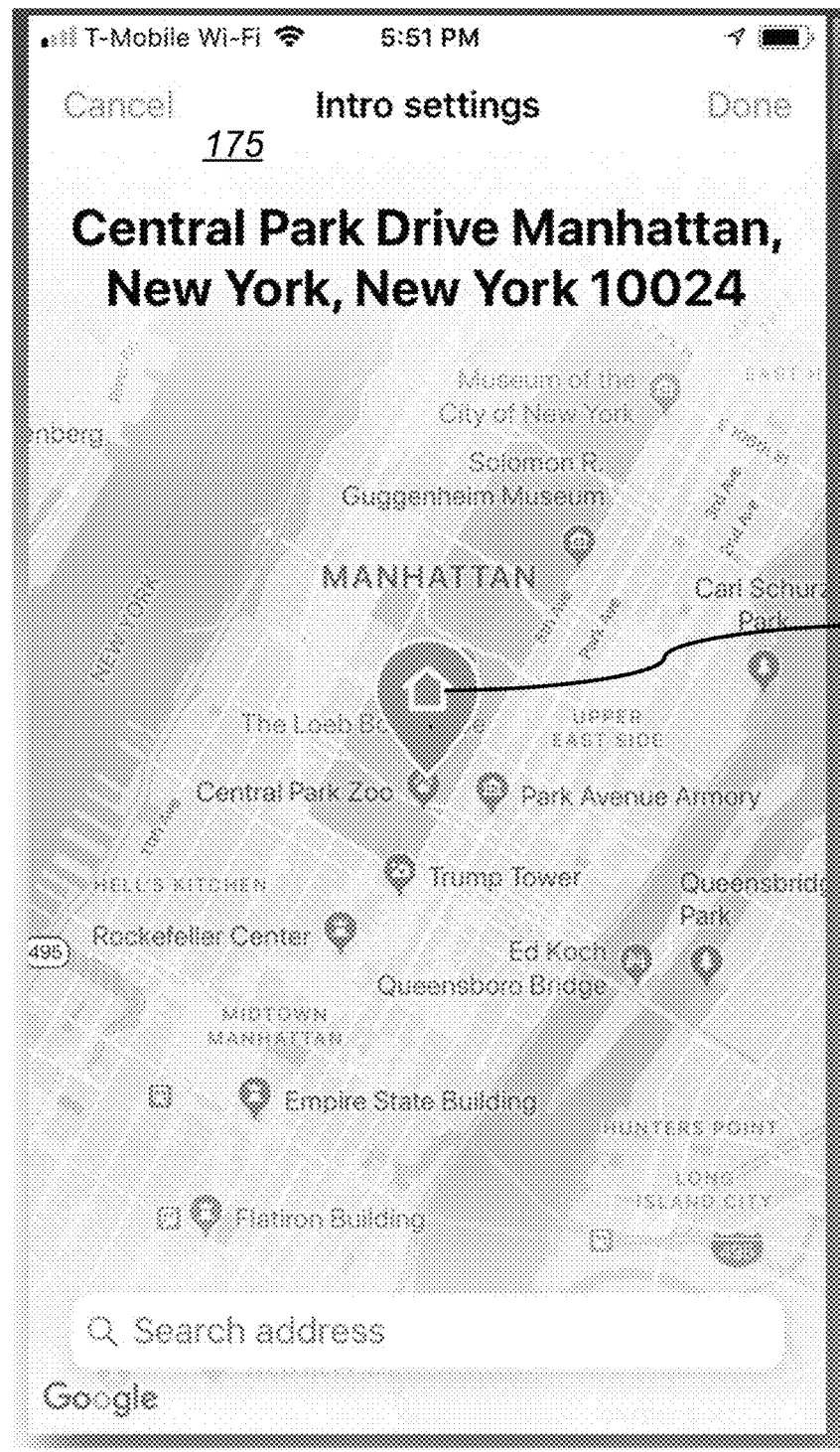
FIG. 4D depicts a screen shot of the user interface for selecting a location of a real estate listing in the step of FIG. 4A.
Figure 5:
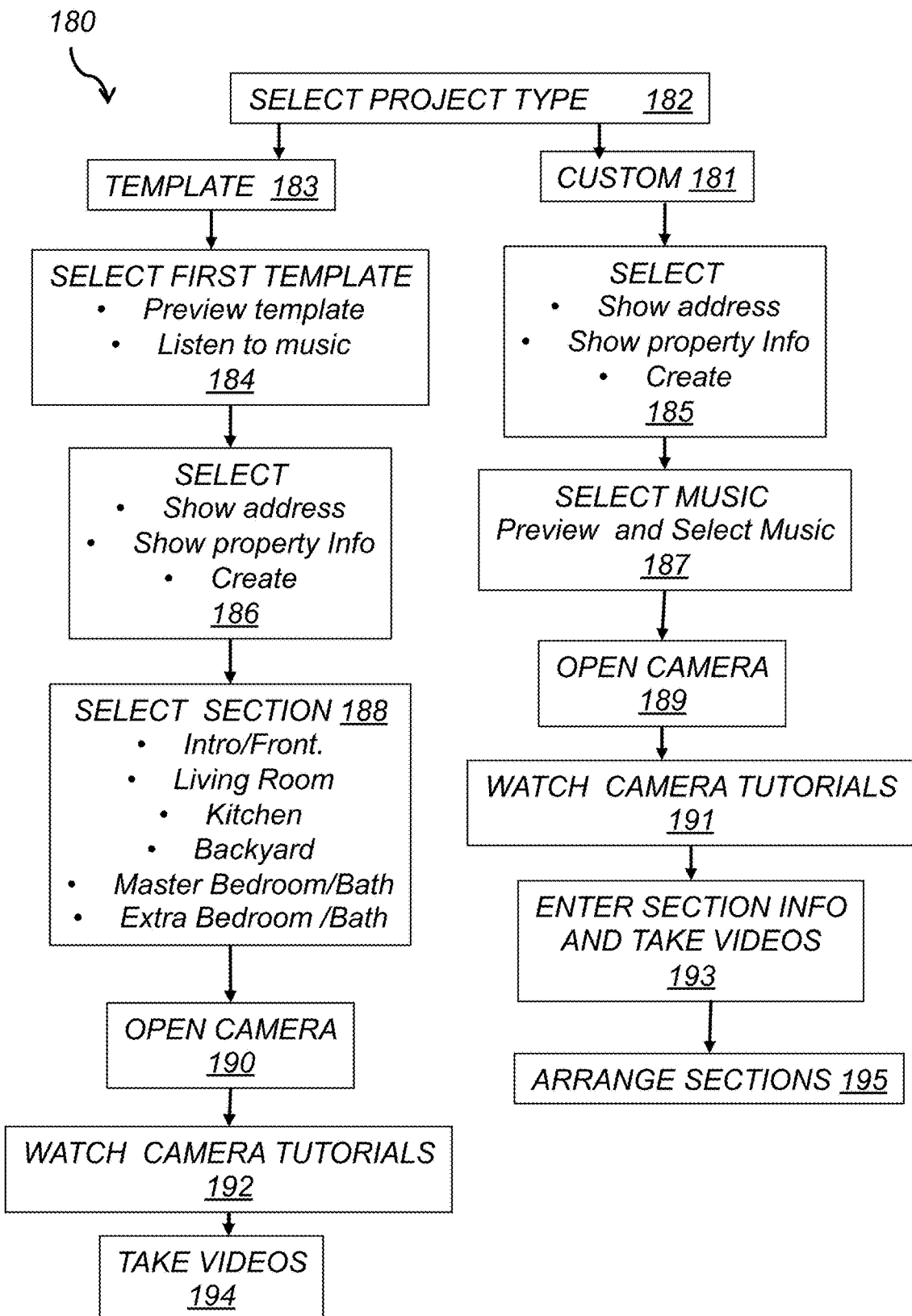
FIG. 5 depicts a block diagram of the step of creating a real estate video project in the process of FIG. 2.
Figure 6A:
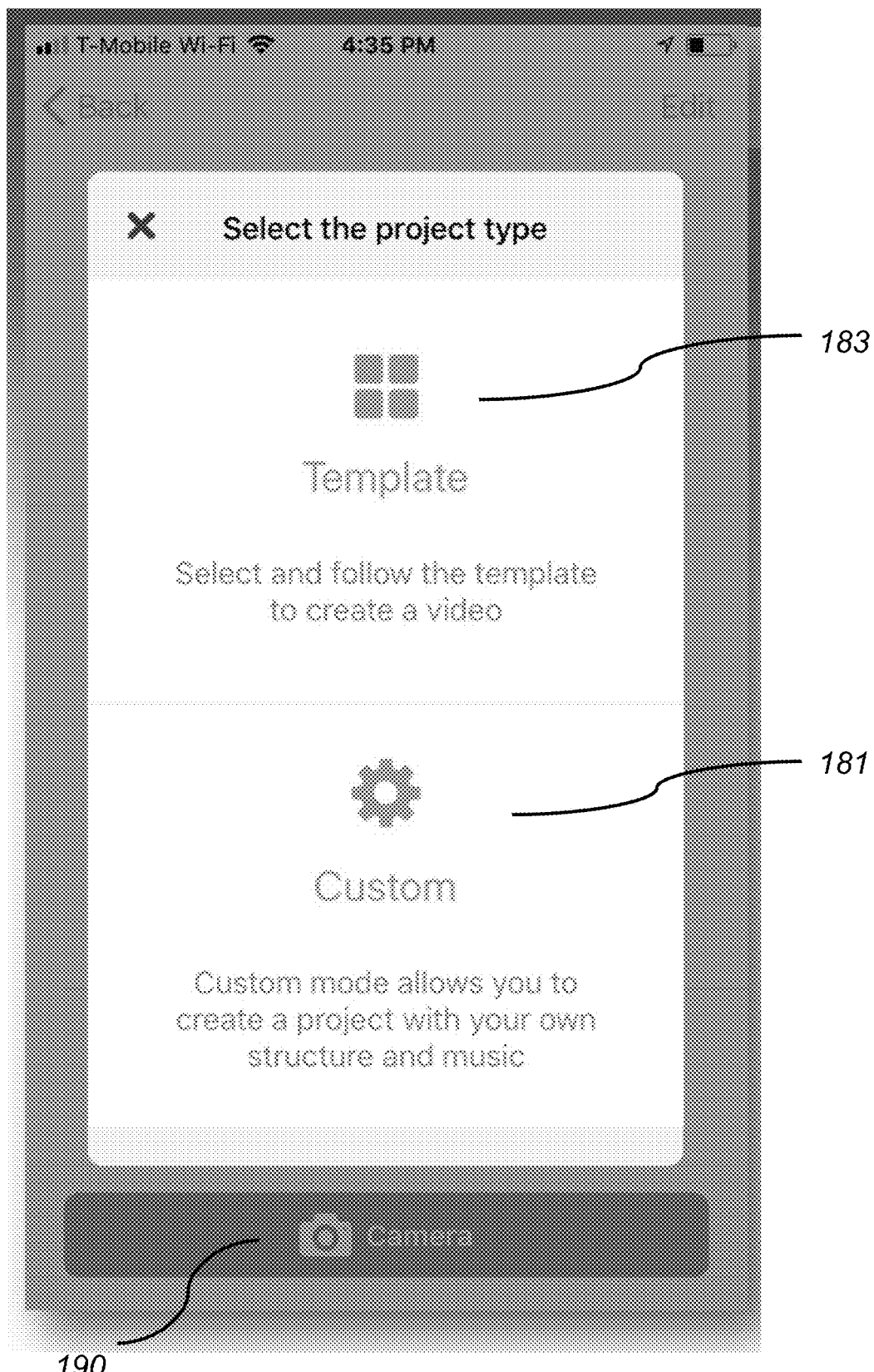
FIG. 6A depicts a screen shot of the user interface for selecting a "template" mode project type in the step of FIG. 5.
Figure 6B:
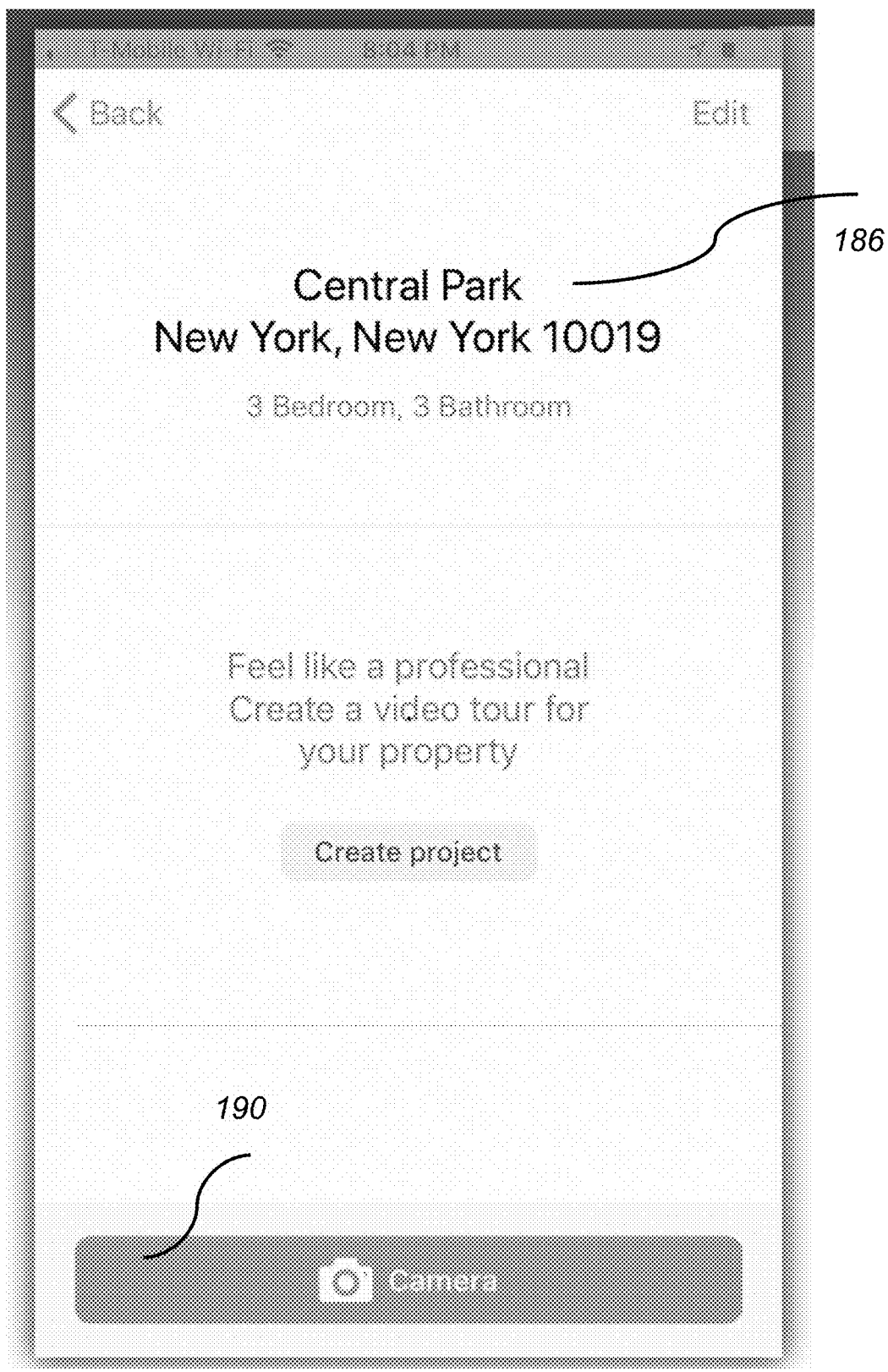
FIG. 6B depicts a screen shot of the user interface for creating a project type with the "template" mode.
Figure 6C:
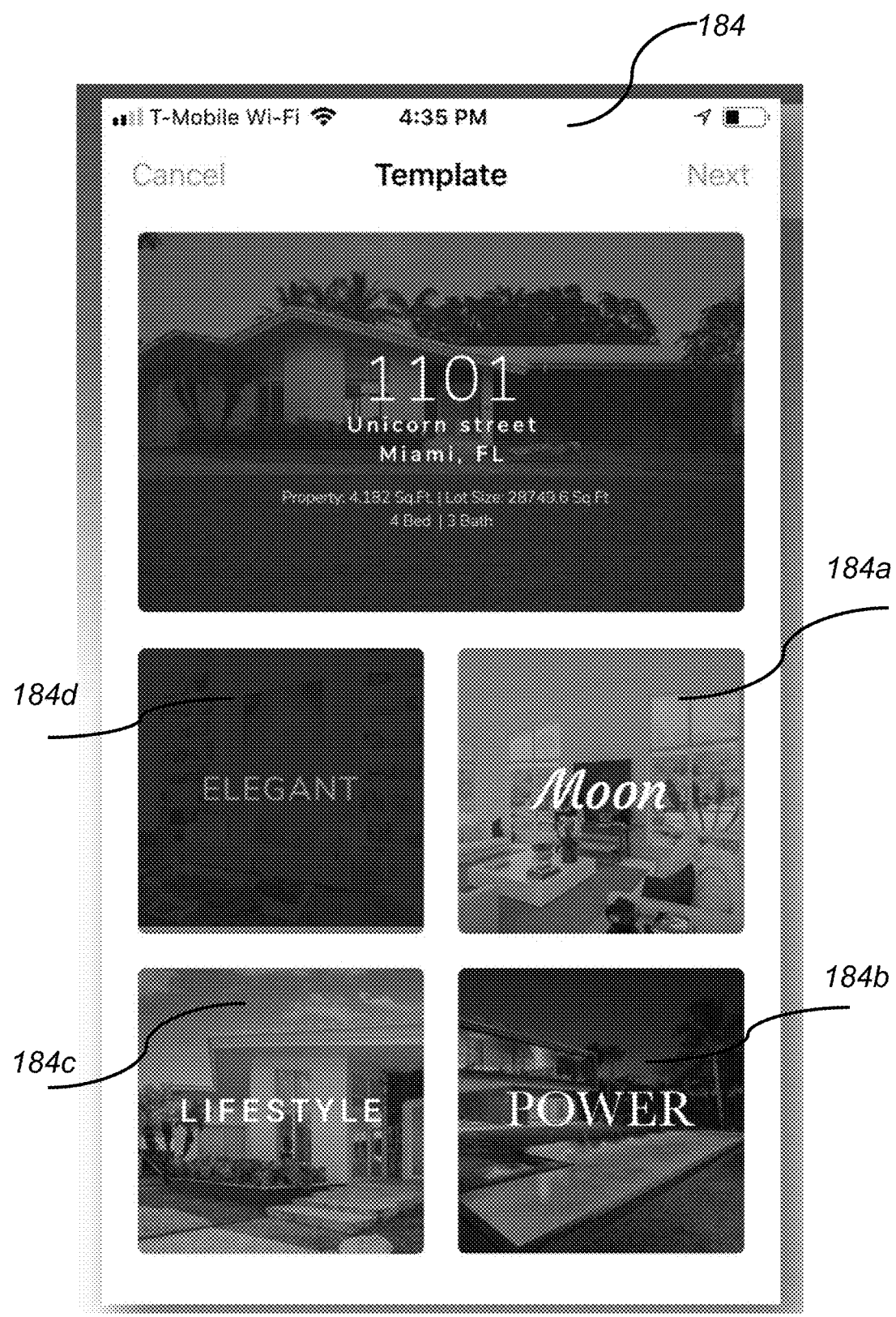
FIG. 6C depicts a screen shot of the user interface for selecting a specific "template" in the step of FIG. 5.
Figure 6D:
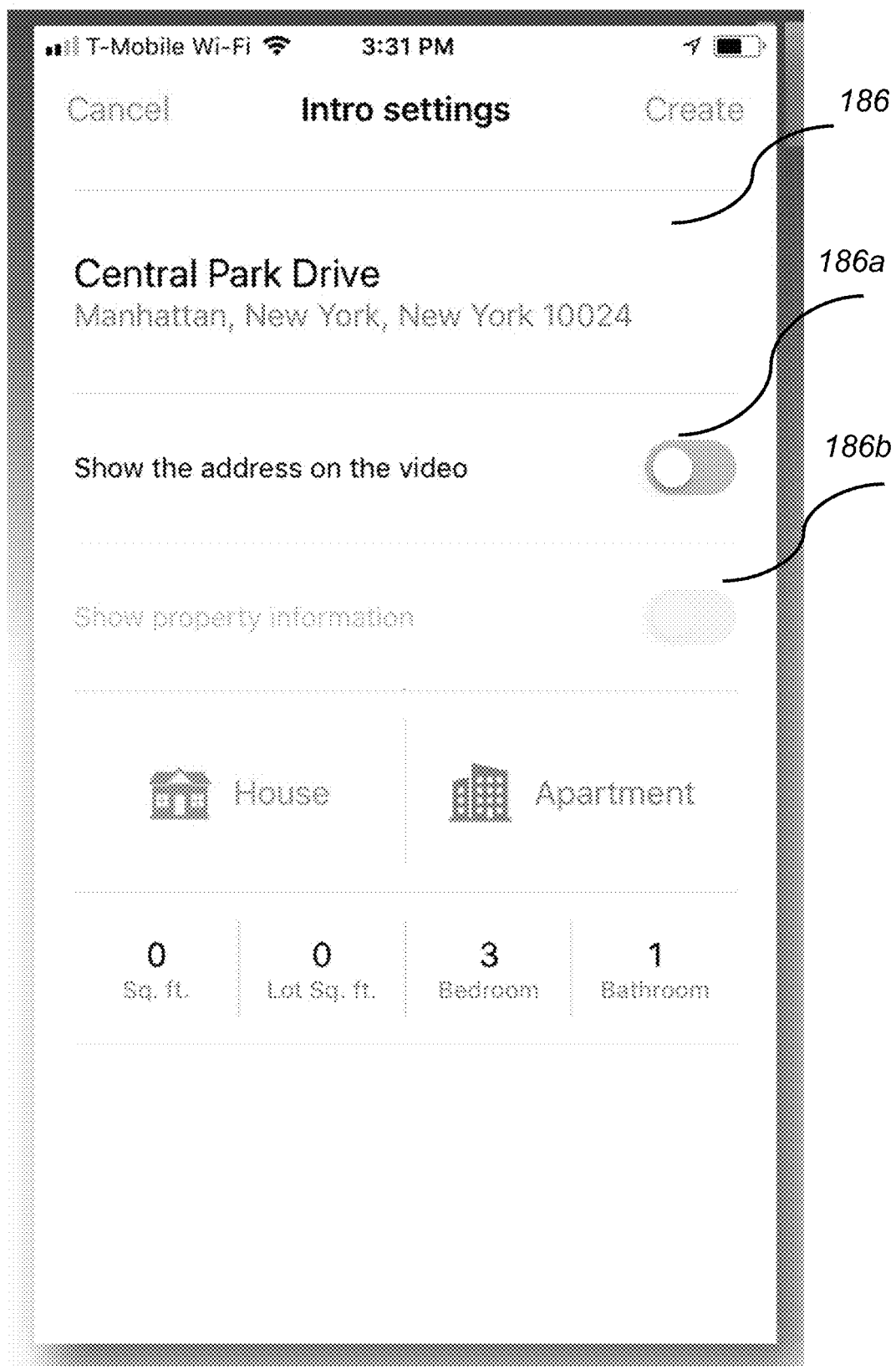
FIG. 6D depicts a screen shot of the user interface for selecting the settings for the real estate listing in the "template" mode of step of FIG. 5.
Figure 6E:
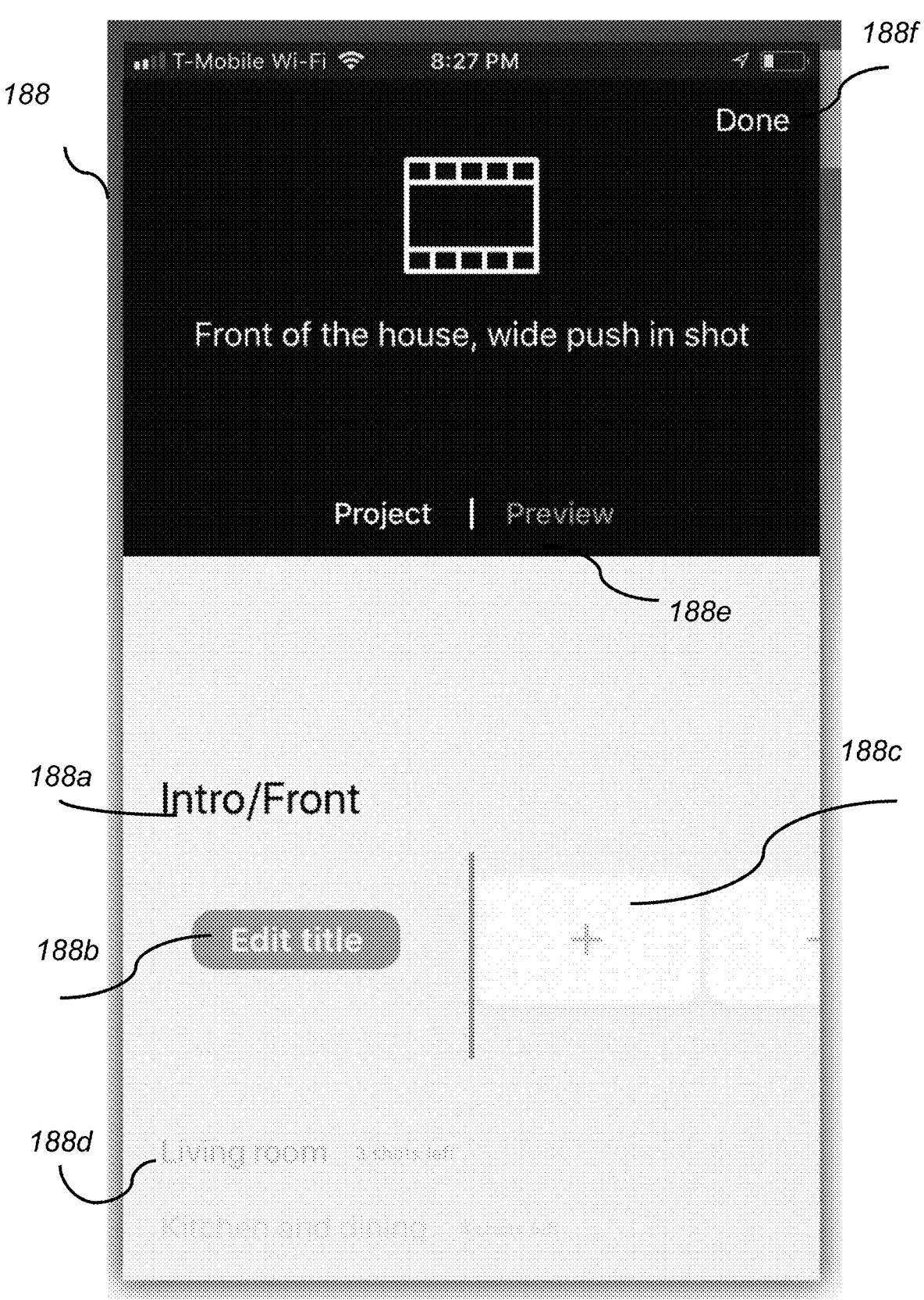
FIG. 6E depicts a screen shot of the user interface for taking a video of a section of a house in the "template" mode of step of FIG. 5.

Referring to FIG. 3A and FIG. 3B, the step of creating a user profile (160) includes the following. First, the user selects the profile icon 162 at the right bottom of the mobile communication device 102 user interface (UI) 161. In the same UI 161, the user selects "ADD COMPANY LOGO" (164), then selects an image of the company logo, enters the company logo and then selects "done". The image of the company logo is selected from the camera roll that is stored in the memory 104 of the mobile communication device 102 or is downloaded from the online storage device 106. Next, the user selects and enters in the same UI 161, name, email, phone number, company name and position, among others (166).

Referring to FIG. 4A, FIG. 4B, FIG. 4C and FIG. 4D, the step of creating a real estate listing (170) includes the following. First, the user selects the listing icon 172 at the right bottom of the mobile communication device 102 user interface (UI) 171. Next, the user selects "Choose house location" (174) in the UI 173. The location may be "current location", or may be entered by moving a marker 177 on an online map 175, or the location may be typed in and searched in the map 175. Next, the user selects the type of house (176). The type of house may be a condo, an apartment or a single-family house. Next, the user selects and enters the size of the house, the size of the lot, the number of bedrooms, number of bathrooms and other house information (178), and then the user selects "create" (179). Based on all the entered data, the video generating application generates dynamically a specific shot list per room and presents it to the user. In an example of a single-family house, the shot list for the front of the house includes the following: one shot straight on, one shot in "reveal" mode and one shot moving "left to right". In an example of a condo, the shot list includes additional areas such as lobby, gym, balcony and rooftop terrace.

Figure 7A:
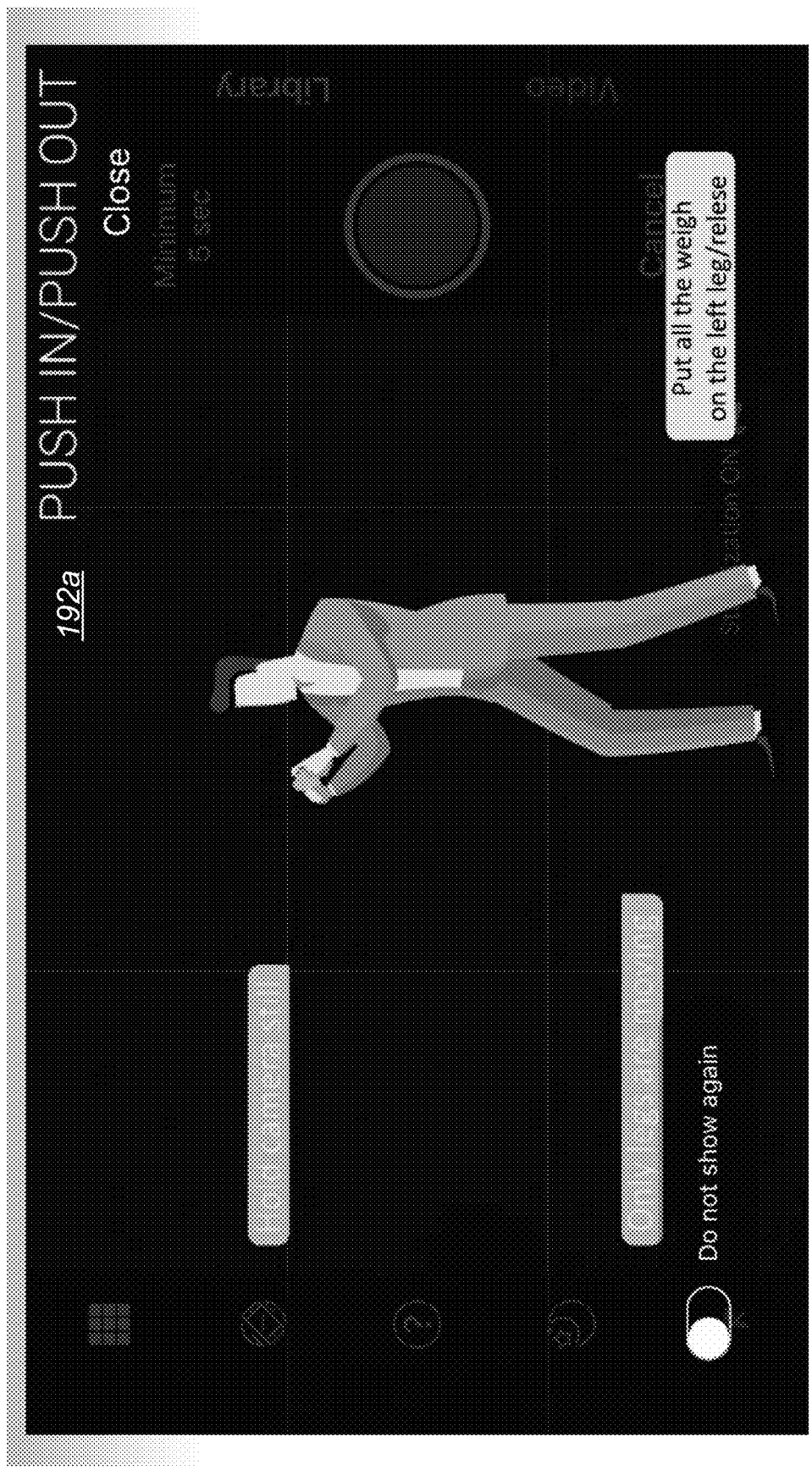
FIG. 7A depicts a screen shot of the tutorial for taking a "push in/push out" shot in the step of FIG. 5.
Figure 7B:
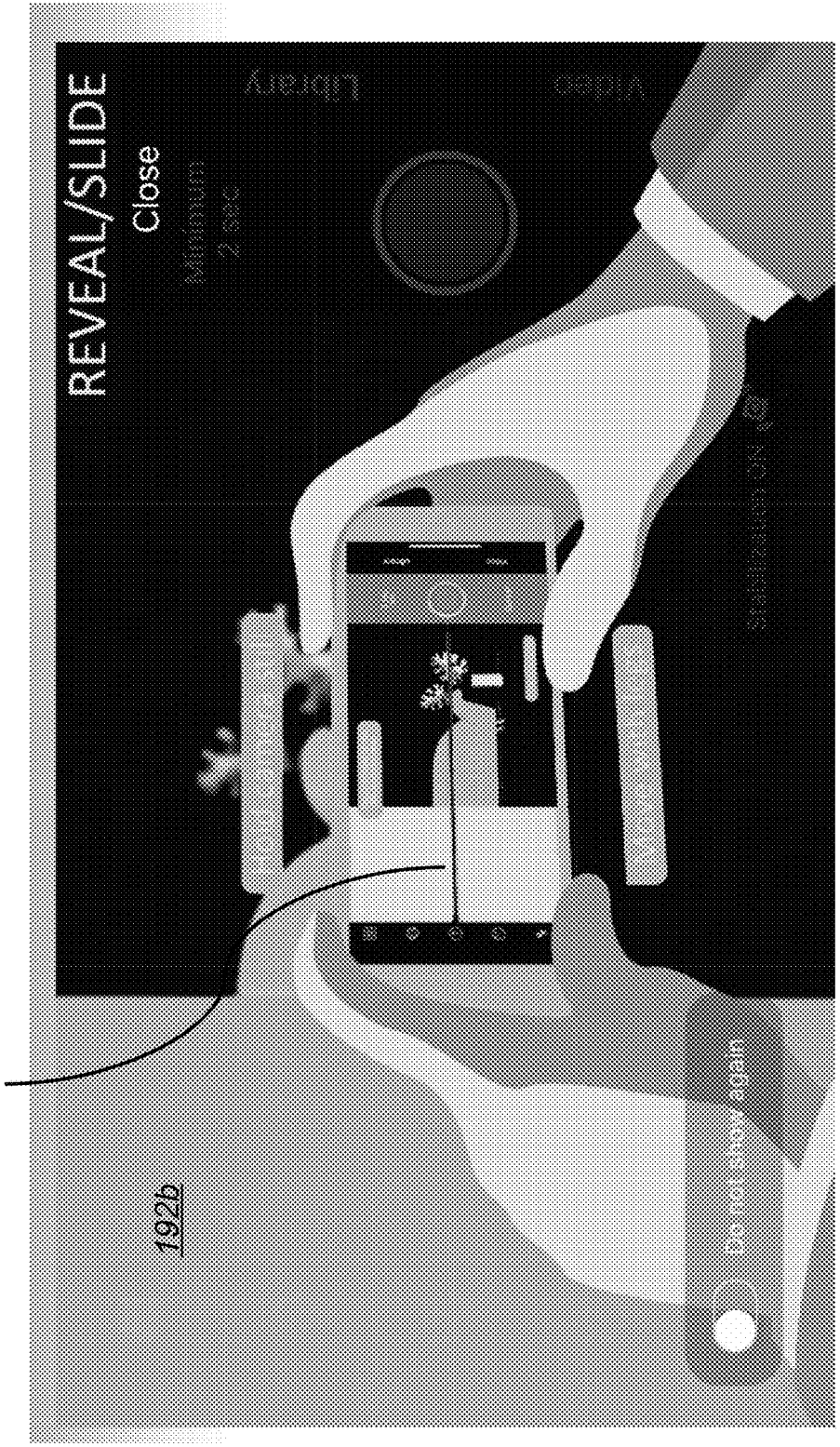
FIG. 7B depicts a screen shot of the tutorial for taking a "reveal/slide" shot in the step of FIG. 5.
Figure 7C:
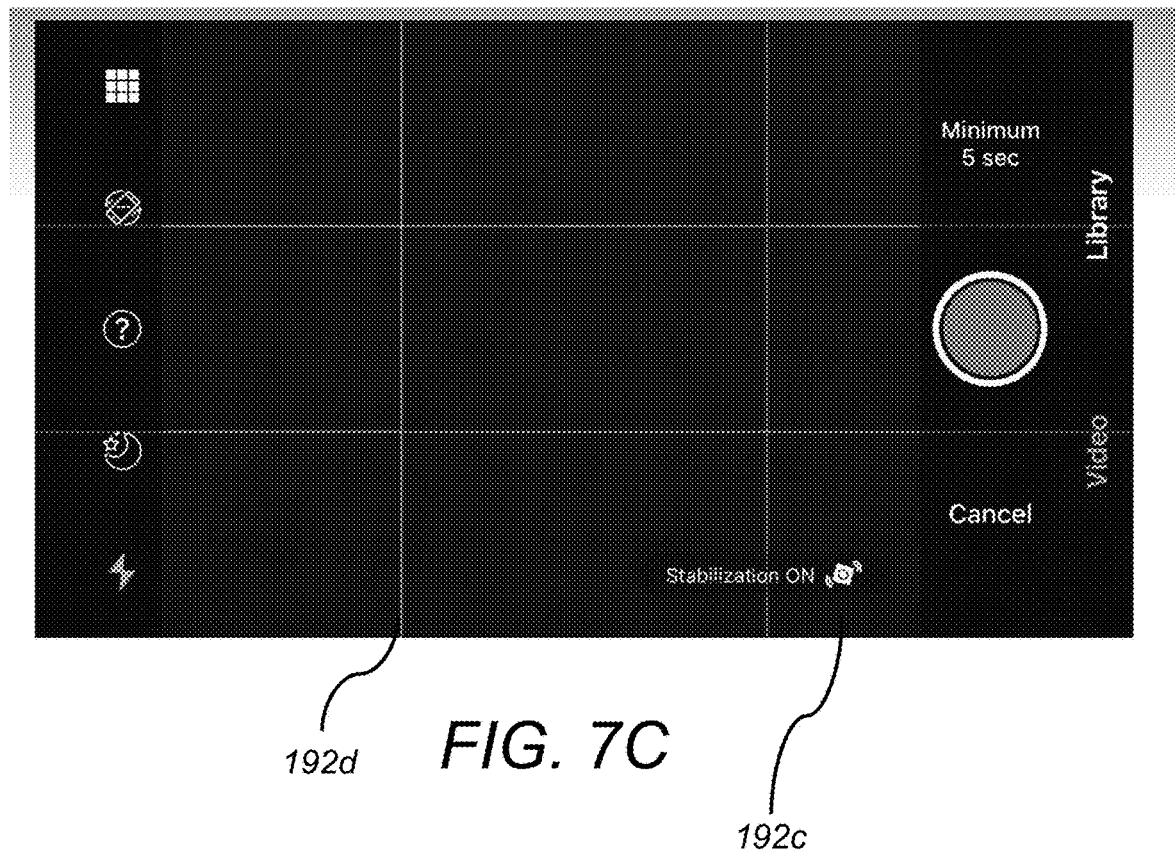
Figure 7D:
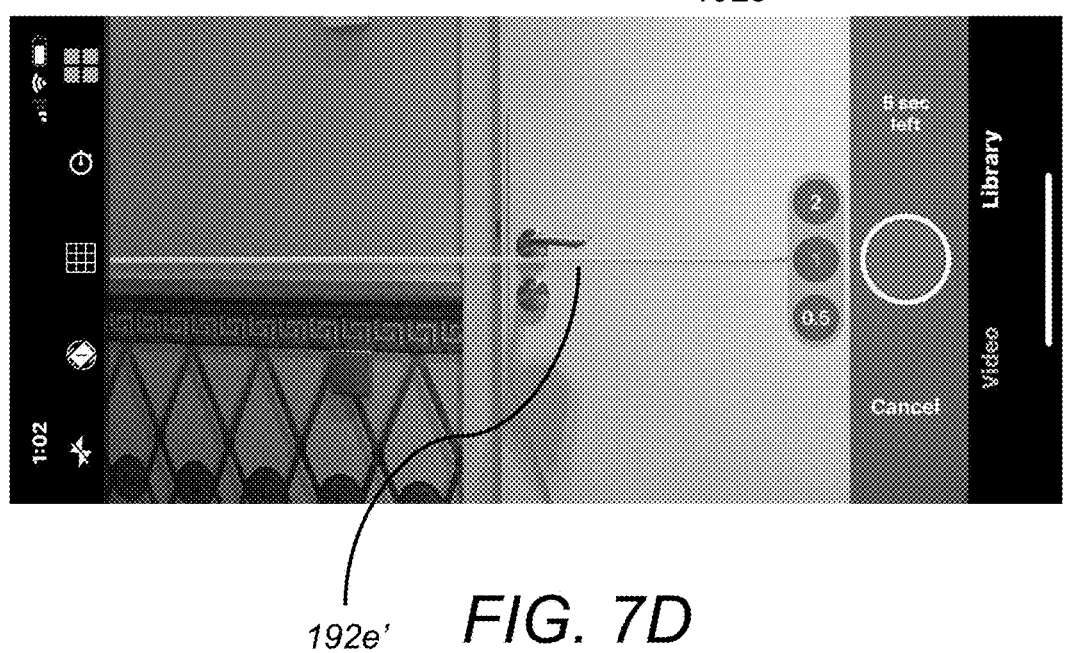
FIG. 7D depicts a screen shot of the user interface for taking a video shot showing the marker line.
Figure 7E:
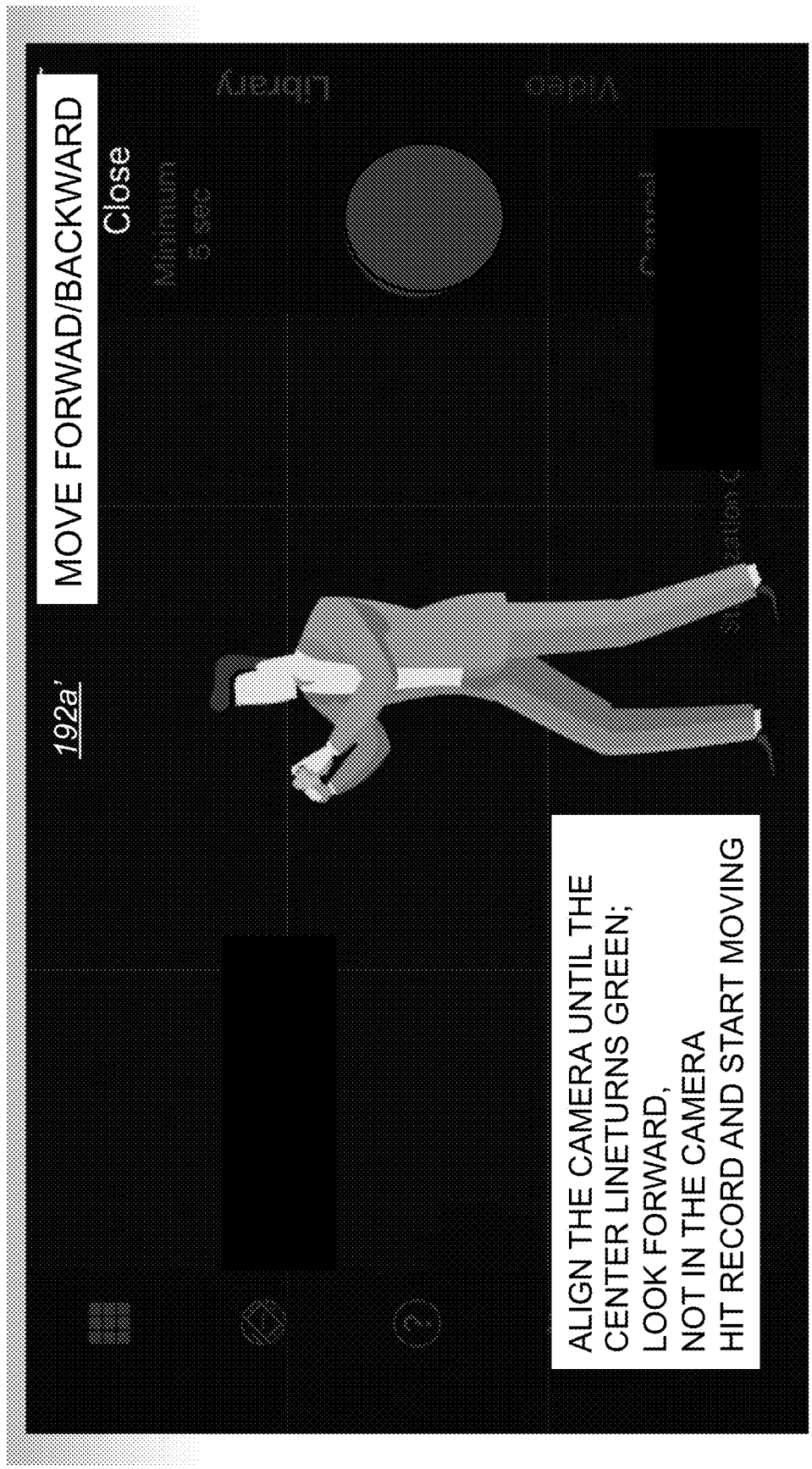
FIG. 7E depicts a screen shot of the tutorial for taking a "move forward/backward" shot in the step of FIG. 5.
Figure 8A:
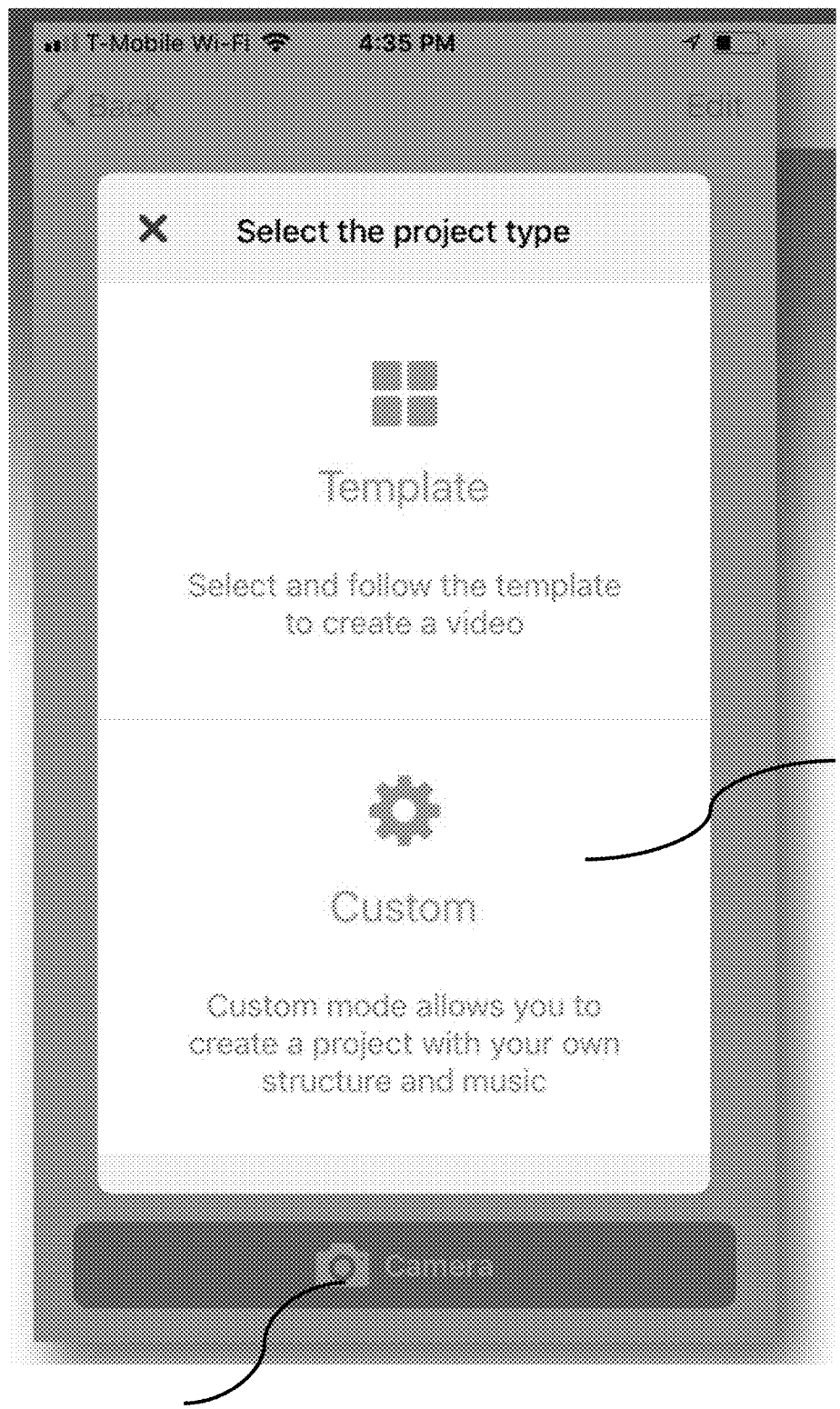
FIG. 8A depicts a screen shot of the user interface for selecting a "custom" mode project type in the step of FIG. 5.
Figure 8B:
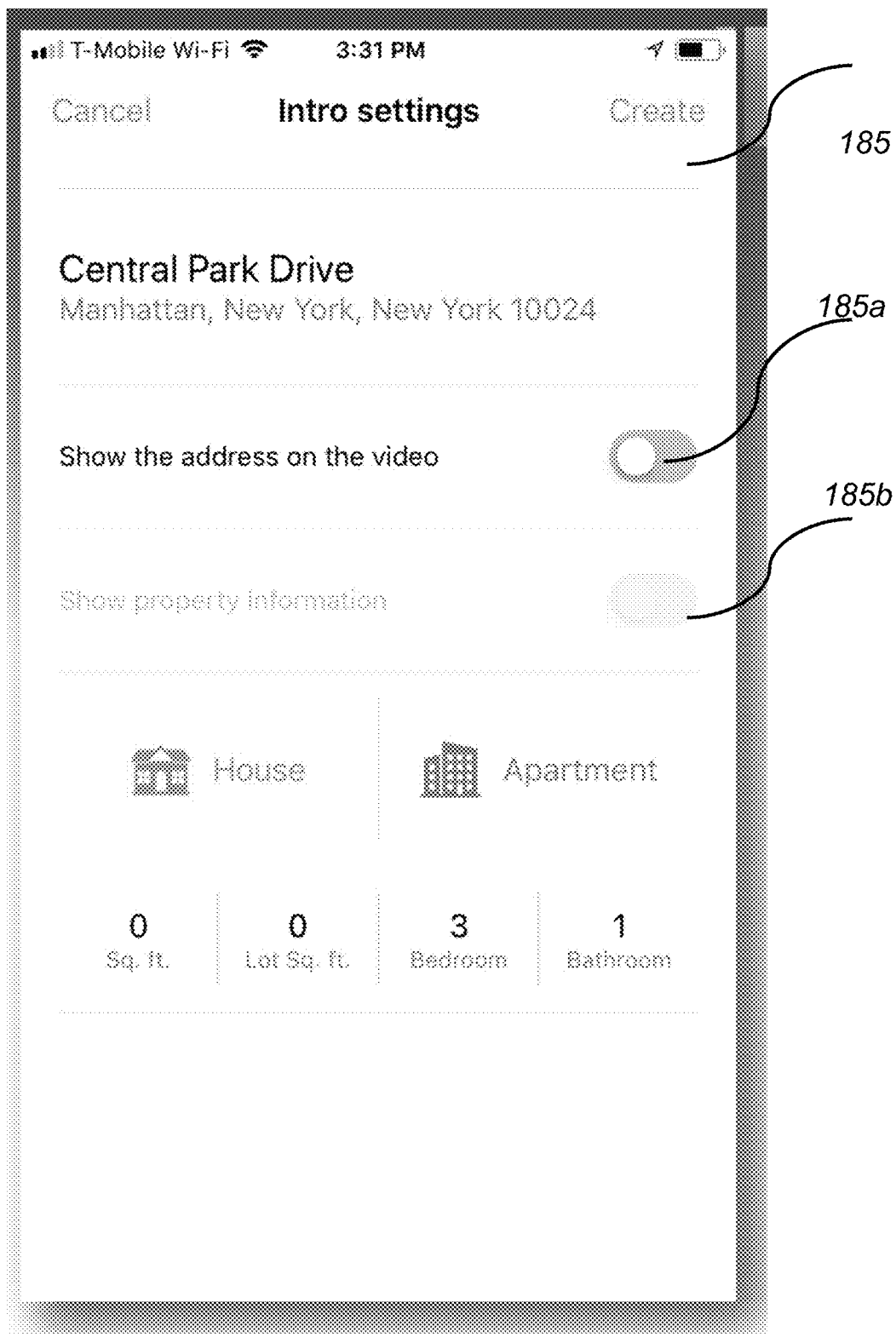
FIG. 8B depicts a screen shot of the user interface for selecting the settings for the real estate listing in the "custom" mode step of FIG. 5.
Figure 8C:
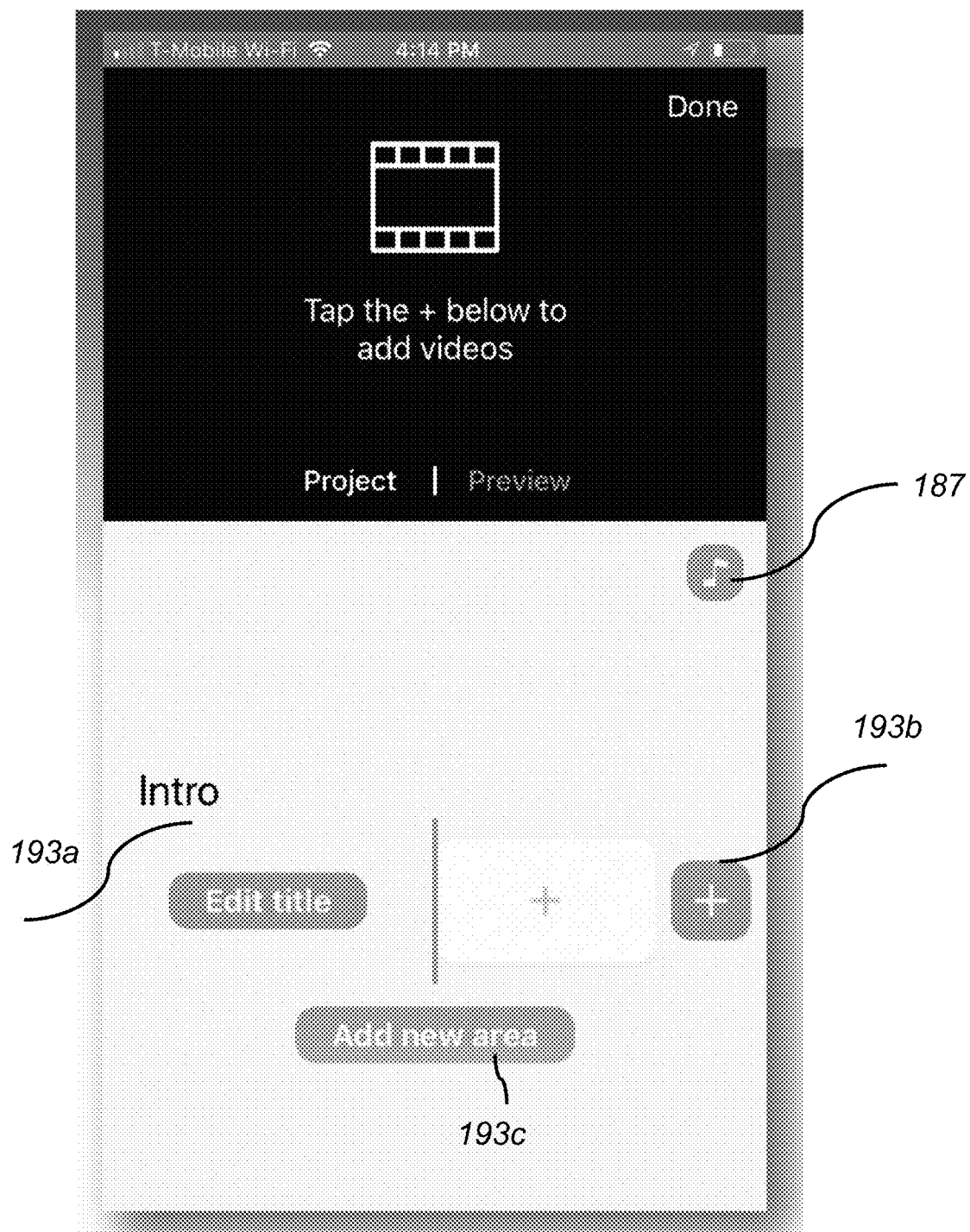
FIG. 8C depicts a screen shot of the user interface for taking a video of the front of the house section in the "custom" mode step of FIG. 5.

Referring to FIG. 5, FIG. 6A-FIG. 6E, FIG. 7A-FIG. 7C and FIG. 8A-FIG. 8C, the step of creating a real estate video project (180) includes the following. First, the user selects the project type that is to be created by using either a "Template" mode (183) or a "Custom" mode (181). The "Template" mode (183) provides a pre-arranged set of sections and walks the user through guided steps to create a video without having to make any creative effort or planning regarding structure and music. The "Custom" mode (181) allows the users to create a video with their own structure and music that can be chosen from a music library. The user can create multiple video projects for the same listing. In the "Template" mode (183) the user previews the available templates and listens to the music that accompanies each of the videos by touching the speaker icon that appears when a specific video is selected (184). Next, the user selects a first template and chooses to show or not show the property address and property information and then selects "create" (186). The template provides various pre-arranged sections including the front section of the property (Intro/Front) 188a, living room 188d, kitchen, backyard, master bedroom, master bathroom, extra bedroom, extra bathroom, among others. The user selects the section (188a, 188d) that is to be videographed (188) and then opens the camera of the mobile communication device (190). The title of the section may be edited and changed if necessary by selecting the edit title button (188b). The camera of the mobile communication device is opened by selecting the +button (186). Once the camera opens, several tutorial videos (192a, 192a', 192b) become automatically available to play (192). The tutorial videos instruct the user how to shoot a video in order to get the best results. After watching the tutorial videos, the user proceeds to take the video of the selected section (194). The process repeats for each section until all sections are videographed. In one example, a move forward/backward video tutorial 192a' directs the user to stand still in front of the room to be videographed, hold the camera still, align the horizontal view line with a yellow marker line, and then move forward or backward while taking the shot, as shown in FIG. 7E. In another example, a push in/push out video tutorial 192a directs the user to stand still with the left leg forward in front of the room to be videographed, hold the camera still, align the horizontal view line with a yellow marker line, put all the weight on the left front leg and move the body forward (push-in) or backward (push-out) while taking the shot, as shown in FIG. 7A. In another example, a reveal/slide video tutorial 192b directs the user to stand still with the feet sidewise apart in front of the room or object to be videographed, hold the camera still, align the horizontal view line with a yellow marker line, and move the body linearly sidewise left to right (or right to left) while taking the shot, as shown in FIG. 7B. In another example, a rotation video tutorial directs the user to stand still with the feet sidewise apart in front of the room or object to be videographed, hold the camera still, align the horizontal view line with a yellow marker line, and rotate the body left to right (or right to left) while taking the shot. The user has the option to preview each video and choose "done" if satisfied with the quality of the video, or delete the video and take the video again. The user has the option to preview each video 188e and choose "done" 188f if satisfied with the quality of the video, or delete the video and take the video again.

Figure 9:
FIG. 9 depicts a screen shot of the user interface for asking a professional to create a real estate project using the process of FIG. 2.

In the "Custom" mode (181) the user first chooses to show or not show the property address 185a and property information 185b and then selects "create" (185). Next, the user previews and selects the music that will accompany the video by clicking the music icon (187) and then opens the camera of the mobile communication device by selecting the +button 193b (189). Once the camera opens, several tutorial videos 192a', 192a, 192b become automatically available to play to show the user how to shoot the video in order to get the best results (191). After watching the tutorial videos 192a', 192a, 192b, the user proceeds to enter the title and information of a first section of the property and then takes the video of the first section (193). The video tutorials are similar to the above mentioned tutorial examples. The video of each section is previewed and accepted or deleted and retaken, if necessary. The process repeats for each desired section until all desired sections are videographed. Next, the user arranges the videos of the various sections according to his preference and then the application composes the video from the individual video sections within 30 seconds and presents is for a preview (195). If the final video is acceptable, the user presses the "done" icon and the application saves the final product. If the user is not satisfied with the final product, he can go back into the project, delete the video sections that he does not like and retake them again. The application also provides the option to contact a professional videographer to assist with the video taking, if necessary, as shown in FIG. 9. The professional videographer is contacted via e-mail or phone, as shown in FIG. 9, or via a text or messaging service. The professional videographer may be a live person, or a "virtual producer" application, or a smart chatbot. The live professional videographer, and/or the "virtual producer" app and/or the smart chatbot are able to access and see the user's screen and can speak to the user and guide the user as the user is filming the property.

As was mentioned above, there is a yellow marker line 192e that needs to be aligned with the horizontal view line to ensure that the mobile communication device is held straight and at the right height, as shown in FIG. 7B. Once the yellow marker line 192e is aligned with the horizontal view line, the yellow marker line becomes green 192e', as shown in FIG. 7D. The application also provides a grid 192d displayed on the camera screen in order to line up the horizon. The user receives a green light to start video recording only after the horizontal marker line 192e is aligned with the horizontal view line. This horizontal alignment is important especially for real estate listing application because the vertical lines of the listed property need to look straight. This alignment process utilizes the gyroscopic technology that is embedded in the mobile phone device to discern the perfect level for the camera to be set at to create perfect vertical lines in the image that are required by any architectural videographer.

In addition, it is important to make the space look as big as possible and therefore ultra-wide lenses are added to the camera of the mobile phones that are used for the video recording. The camera lenses have 1× and 2× and 0.5× (ultra wide) focal lengths. In addition to the video tutorials, the application provides a stabilization tool 192c that stabilizes the shot so it is smooth. The stabilization tool 192c stabilizes the shot and removes any shaking that may occur when the user moves while taking the video, by rounding off the corners of the image. The stabilization tool 192c is an advantageous feature of the application because it does not require an external gimbal stabilizer. Other application tools include a brightness adjuster that adjusts the brightness of the shot and an auto flash on/off button.

Figure 11:
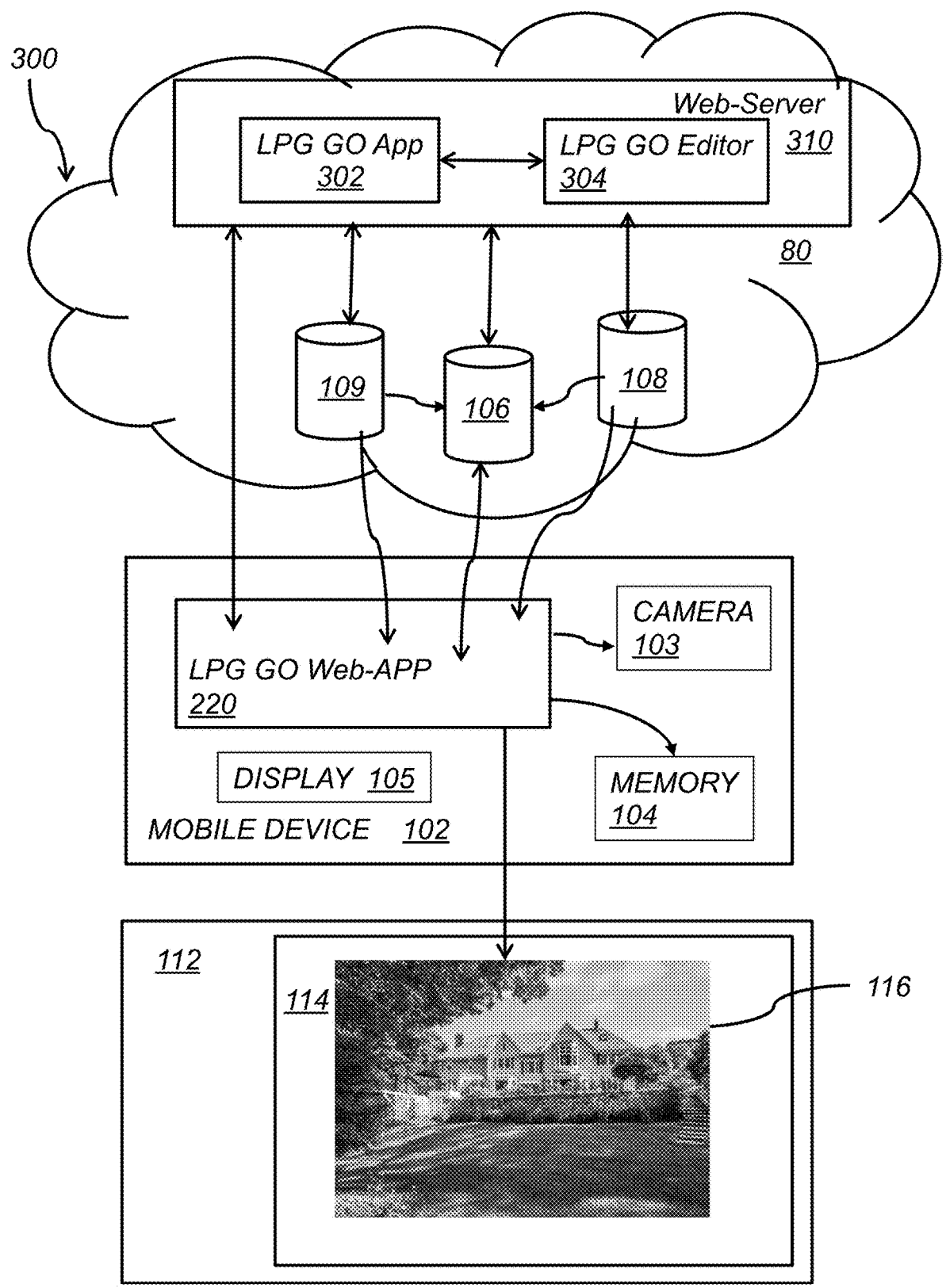
FIG. 11 is a diagrammatic view of a video generating and editing system according to this invention.

Referring to FIG. 11, the video generating and editing system 300 according to this invention includes a mobile communication device 102, and a web-server 310. Web-server 310 includes a web-based video generating application (LPG GO App) 302 and a video editor (LPG GO Editor) 304. The mobile communication device 102 includes a camera 103, a display 105, memory 104 and a copy of the web-based video generating application (LPG GO Web-App) 220 stored in memory 104. The mobile communication device 102 connects via a network connection 80 to web-server 310 and downloads or directly accesses the video generating application 220. The mobile communication device 102 also connects to an online data storage device 106, an authentication server 108 and a global mapping server 109. In one example, the mobile communication device 102 is a mobile phone (e.g., iPhone™, or Android™), server 110 is a server for the Apple Store™, the online data storage device 106 is Dropbox™, the authentication server 108 is an Amazon™ server and the global mapping server 109 is a Google™ maps server. A video 116 generated with the video generating system 300 is viewed via a display 105 of the mobile communication device 102 or via a display 114 in a separate device 112. In other examples, the mobile communication device is a tablet, a digital camera, a mobile phone, a laptop computer, a drone, or any other computing device with a camera.

Figure 12:
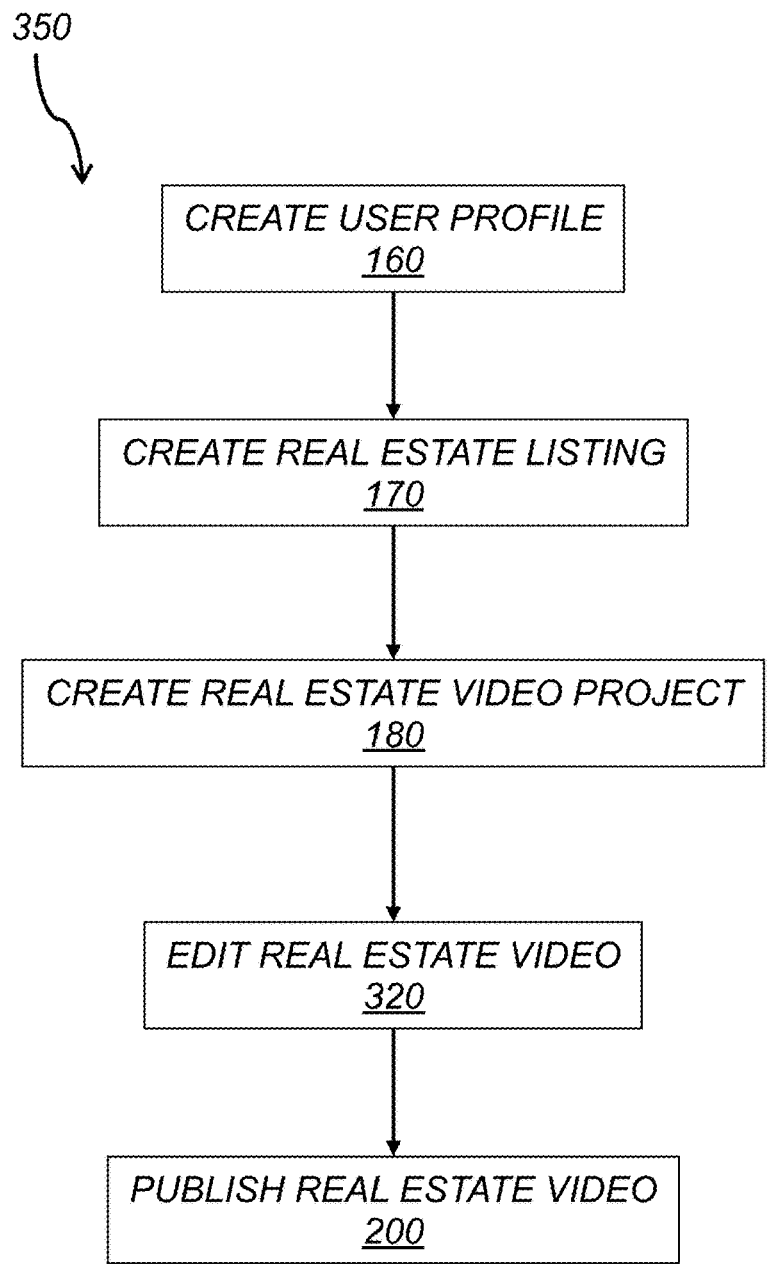
FIG. 12 is a block diagram of the process of generating and editing a video according to this invention.

Referring to FIG. 12, a process 350 for generating and editing a video with the video generating system 300 according to this invention includes the following steps. First, a user logs into the video generating application 220 in the mobile communication device 102 and creates a user profile (160). Next, the user creates a real estate listing (170) and then creates a real estate video project (180). Next, the video project is edited (320) and finally, the user publishes the real estate video (200).

Figure 13:
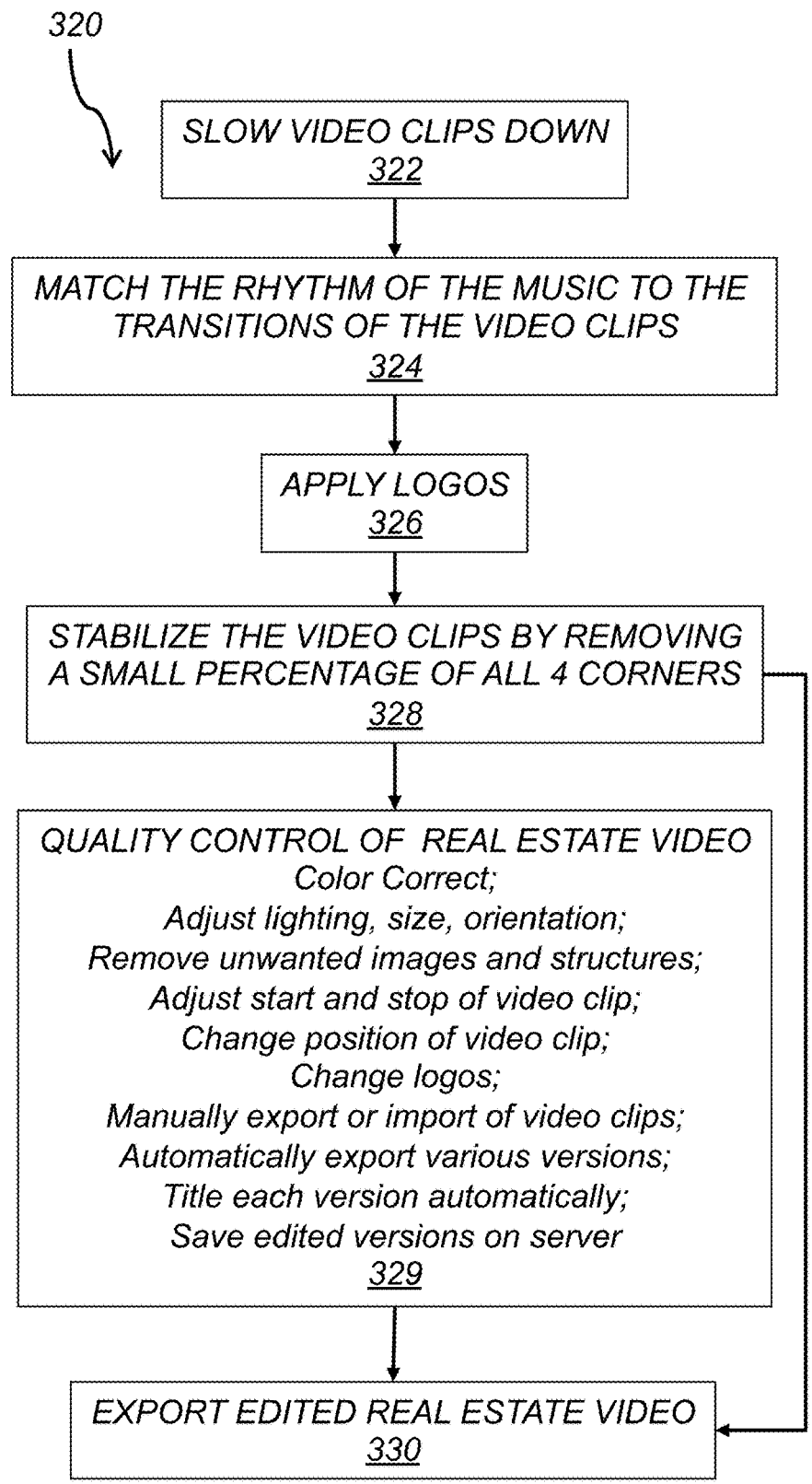
FIG. 13 is a block diagram of the step of editing a video in the process of FIG. 12.

Referring to FIG. 13, the editing step 320 of the process 350 for generating and editing a video includes the following. First, the video editor 310 (LPG GO Editor) slows the video clips down (322). The slowing down step (322) generates a smooth shot by removing every other frame. In one example the video clips are filmed at 1080 pixels (p)/60 frames per second (fps) and are edited with the video editor 310 to go from 1080 pixels (p)/60 frames per second (fps) resolution to 1080p/30 fps, which slows down the video clips by half. In another example, all even numbered frames are removed and this slows down the video clips by half. All video shots are programed to be 3 seconds long, and by removing every other frame the video editor 310 converts the video into 6 slow seconds. Next, the video editor matches the rhythm of the music to the transitions of consecutive video clips (324). Next logos are applied to the video clips (326) and then the video clips are stabilized by removing a small percentage from all four corners of each frame (328). The edited video may be exported for public viewing (330), if the user chooses to do so. In some embodiments additional quality control and editing is provided by professional editors using the web-based editor (329). The additional quality control and editing step (329) includes one or more of color correction, adjusting of lighting, size and orientation, removal of unwanted images and structures, adjustment of the start and stop of the video clips, change of position and sequence of the video clips, change of logos, manual export or import of video clips, automatic export of various versions of the video, titling of each video version and saving of each video version. Finally the user is notified that the professionally edited video is ready and the professionally edited video is exported for public viewing 330. The exported video may have different sizes depending upon the medium where it will be viewed through. The exported video may be unbranded, branded or LPG-GO-branded. The video editing steps 322, 324, 326 and 328 may be performed automatically by the LPG GO editor 304. The additional quality control step 329 is performed by professional editors, as was mentioned above.

Figure 10:
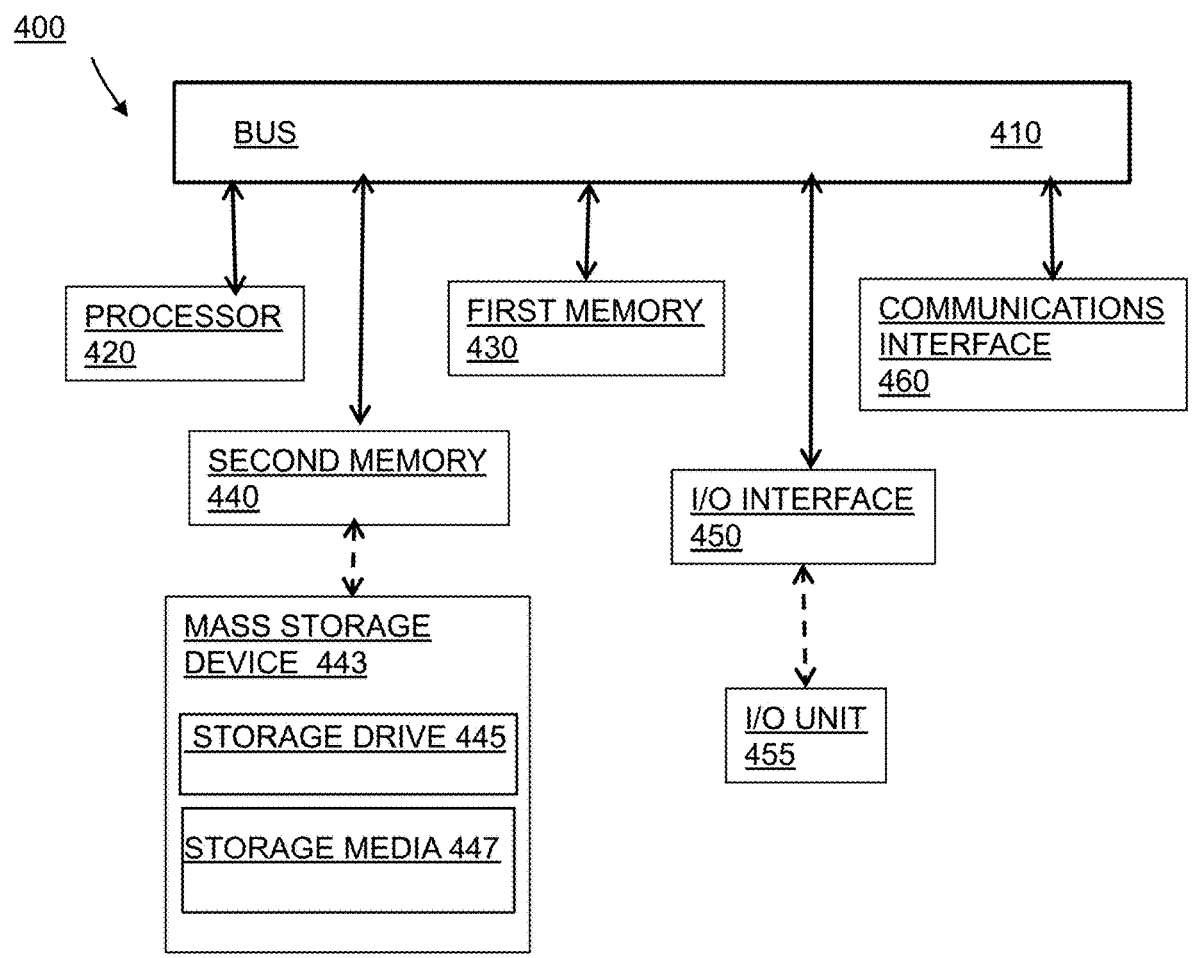
FIG. 10 depicts a computer system used for running the applications and methods of this invention.

Referring to FIG. 10, an exemplary computer system 400 associated with the mobile communication device or network architecture that may be used to implement the system of the present invention includes at least a processor 420, first memory 430, second memory 440, I/O interface 450 and communications interface 460. All these computer components are connected via a bus 410. One or more processors 420 may be used. Processor 420 may be a special-purpose or a general-purpose processor. As shown in FIG. 10, bus 410 connects the processor 420 to various other components of the computer system 400. Bus 410 may also connect processor 420 to other components (not shown) such as, sensors, and servomechanisms. Bus 410 may also connect the processor 420 to other computer systems. Processor 420 can receive computer code via the bus 410. The term "computer code" includes applications, programs, instructions, signals, and/or data, among others. Processor 420 executes the computer code and may further send the computer code via the bus 410 to other computer systems. One or more computer systems 400 may be used to carry out the computer executable instructions of this invention.

Computer system 400 may further include one or more memories, such as first memory 430 and second memory 440. First memory 430, second memory 440, or a combination thereof function as a computer usable storage medium to store and/or access computer code. The first memory 430 and second memory 440 may be random access memory (RAM), read-only memory (ROM), a mass storage device, or any combination thereof. As shown in FIG. 10, one embodiment of second memory 440 is a mass storage device 443. The mass storage device 443 includes storage drive 445 and storage media 447. Storage media 447 may or may not be removable from the storage drive 445. Mass storage devices 443 with storage media 447 that are removable, otherwise referred to as removable storage media, allow computer code to be transferred to and/or from the computer system 400. Mass storage device 443 may be a Compact Disc Read-Only Memory ("CDROM"), ZIP storage device, tape storage device, magnetic storage device, optical storage device, Micro-Electro-Mechanical Systems ("MEMS"), nanotechnological storage device, floppy storage device, hard disk device, USB drive, among others. Mass storage device 443 may also be program cartridges and cartridge interfaces, removable memory chips (such as an EPROM, or PROM) and associated sockets.

The computer system 400 may further include other means for computer code to be loaded into or removed from the computer system 400, such as the input/output ("I/O") interface 450 and/or communications interface 460. Both the I/O interface 450 and the communications interface 460 allow computer code to be transferred between the computer system 400 and external devices including other computer systems. This transfer may be bi-directional or omni-directional to or from the computer system 400. Computer code transferred by the I/O interface 450 and the communications interface 460 are typically in the form of signals, which may be electronic, electromagnetic, optical, or other signals capable of being sent and/or received by the interfaces. These signals may be transmitted via a variety of modes including wire or cable, fiber optics, a phone line, a cellular phone link, infrared ("IR"), and radio frequency ("RF") link, among others.

The I/O interface 450 may be any connection, wired or wireless, that allows the transfer of computer code. In one example, I/O interface 450 includes an analog or digital audio connection, digital video interface ("DVI"), video graphics adapter ("VGA"), musical instrument digital interface ("MIDI"), parallel connection, PS/2 connection, serial connection, universal serial bus connection ("USB"), IEEE1394 connection, PCMCIA slot and card, among others. In certain embodiments the I/O interface connects to an I/O unit 455 such as a user interface, monitor, speaker, printer, touch screen display, among others. Communications interface 460 may also be used to transfer computer code to computer system 400. Communication interfaces include a modem, network interface (such as an Ethernet card), wired or wireless systems (such as Wi-Fi, Bluetooth, and IR), local area networks, wide area networks, and intranets, among others.

The invention is also directed to computer products, otherwise referred to as computer program products, to provide software that includes computer code to the computer system 400. Processor 420 executes the computer code in order to implement the methods of the present invention. In one example, the methods according to the present invention may be implemented using software that includes the computer code that is loaded into the computer system 400 using a memory 430, 440 such as the mass storage drive 443, or through an I/O interface 450, communications interface 460, or any other interface with the computer system 400. The computer code in conjunction with the computer system 400 may perform any one of, or any combination of, the steps of any of the methods presented herein. The methods according to the present invention may be also performed automatically, or may be invoked by some form of manual intervention. The computer system 400, or network architecture, of FIG. 10 is provided only for purposes of illustration, such that the present invention is not limited to this specific embodiment.

Several embodiments of the present invention have been described. Nevertheless, it will be understood that various modifications may be made without departing from the spirit and scope of the invention. Accordingly, other embodiments are within the scope of the following claims.

What is claimed is:

1. A computer-implemented method for generating and editing a video comprising:
   providing a mobile communication device comprising a camera, a display, a central processing unit (CPU), a video generating application and a memory;
   starting the video generating application;
   opening the camera and providing camera tutorials, wherein the camera tutorials comprise instructions for camera positioning, camera moving, and camera aligning while taking videos;
   taking videos of a scene following the instructions for camera positioning, camera moving, and camera aligning while taking videos;
   uploading the videos to the memory, editing the videos and producing a composite video for the scene; and
   wherein the camera tutorials comprise a "moving forward/backward" tutorial directing a user first to hold the camera still, to align a horizontal view line in the display with a marker line, and then to move the user's body forward or backward while taking a video of the scene.

2. The method of claim 1, wherein the editing of the videos comprises slowing the videos down, and matching rhythm of music accompanying each video to transitions of consecutive videos.

3. The method of claim 2, wherein the slowing down of the videos comprises removing every other frame.

4. The method of claim 1, wherein the camera aligning comprises aligning a horizontal view line with a marker line, and wherein the marker line changes color upon achieving alignment of the camera.

5. The method of claim 1, wherein the camera tutorials further comprise a "push in/push out" tutorial directing a user first to stand still with the user's left leg positioned forward in front of the scene, to hold the camera still, to align a horizontal view line in the display with a marker line, and then to put all the user's weight on the left front leg and to move the user's body forward (push-in) or backward (push-out) while taking a video of the scene.

6. The method of claim 1, wherein the camera tutorials further comprise a "reveal/slide" tutorial directing a user first to stand still with feet sidewise apart in front of the scene, to hold the camera still, to align a horizontal view line in the display with a marker line, and then to move the user's body linearly sidewise left to right (or right to left) while taking a video of the scene.

7. The method of claim 1, wherein the camera tutorials further comprise a "rotational" tutorial directing a user first to stand still with feet sidewise apart in front of the scene, to hold the camera still, to align a horizontal view line in the display with a marker line, and then to rotate the user's body left to right (or right to left) while taking a video of the scene.

8. The method of claim 1, further comprising entering section information for each scene, selecting specific music to accompany each video of each scene, taking videos of each scene and arranging the videos of each scene in a custom order.

9. The method of claim 1, wherein the editing of the videos further comprises stabilizing the videos by removing a small percentage of all four corners of each video.

10. The method of claim 1, wherein the editing of the videos further comprises performing quality control of the videos and wherein the quality control comprises one of color correction, lighting adjustment, size adjustment, orientation adjustment, removal of unwanted images and structures, video start and stop adjustment, position adjustment of each video in the composite video of the scene, changing of logos, manually exporting and importing of videos, automatically exporting various versions of the composite video of the scene, adding a title to each version of the composite video of the scene, and saving the edited versions of the composite video of the scene.

11. The method of claim 1, wherein the mobile communication device comprises one of a tablet, a digital camera, a mobile phone, a laptop computer, a drone, or any other computing device with a camera.

12. A system for generating and editing a video comprising:
- a mobile communication device comprising a camera, a display, a central processing unit (CPU), a video generating application and a memory;
- wherein the mobile communication device is configured to connect to a video application server, an online data storage device, an authentication server and a global mapping server via a network connection;
- wherein the video generating application is configured to provide a user interface via the display and comprises computer implemented instructions for opening the camera and providing camera tutorials, wherein the camera tutorials comprise instructions for camera positioning, camera moving, and camera aligning while taking videos;
- wherein the video generating application further comprises computer implemented instructions for taking videos of a scene according to the instructions of the camera tutorials; and
- wherein the video generating application further comprises computer implemented instructions for uploading the videos to the memory, editing the videos and producing a composite video for the scene;
- wherein the camera tutorials comprise a "moving forward/backward" tutorial directing a user first to hold the camera still, to align a horizontal view line in the display with a marker line, and then to move the user's body forward or backward while taking a video of the scene.

13. The system of claim 12, wherein the computer implemented instructions for editing the videos comprises slowing the videos down, and matching rhythm of music accompanying each video to transitions of consecutive videos.

14. The system of claim 12, wherein the slowing down of the videos comprises removing every other frame.

15. The system of claim 12, wherein the camera aligning comprises aligning a horizontal view line with a marker line, and wherein the marker line changes color upon achieving alignment of the camera.

16. The system of claim 12, wherein the camera tutorials further comprise a "push in/push out" tutorial directing a user first to stand still with the user's left leg positioned forward in front of the scene, to hold the camera still, to align a horizontal view line in the display with a marker line, and then to put all the user's weight on the left front leg and to move the user's body forward (push-in) or backward (push-out) while taking a video of the scene.

17. The system of claim 12, wherein the camera tutorials further comprise a "reveal/slide" tutorial directing a user first to stand still with feet sidewise apart in front of the scene, to hold the camera still, to align a horizontal view line in the display with a marker line, and then to move the user's body linearly sidewise left to right (or right to left) while taking a video of the scene.

18. The system of claim 12, wherein the camera tutorials further comprise a "rotational" tutorial directing a user first to stand still with feet sidewise apart in front of the scene, to hold the camera still, to align a horizontal view line in the display with a marker line, and then to rotate the user's body left to right (or right to left) while taking a video of the scene.

19. The system of claim 12, wherein the video generating application further comprises computer implemented instructions for entering section information for each scene, selecting specific music to accompany each video of each scene, taking videos of each scene and arranging the videos of each scene in a custom order.

20. The system of claim 12, wherein the video generating application further comprises computer implemented instructions for previewing the videos of the scene and accepting them or retaking them.

21. The system of claim 12, wherein the video generating application further comprises computer implemented instructions for stabilizing the videos by removing a small percentage of all four corners of each video.

22. The system of claim 12, wherein the editing of the videos further comprises computer implemented instructions for performing quality control of the videos and wherein the quality control comprises one of color correction, lighting adjustment, size adjustment, orientation adjustment, removal of unwanted images and structures, video start and stop adjustment, position adjustment of each video in the composite video of the scene, changing of logos, manually exporting and importing of videos, automatically exporting various versions of the composite video of the scene, adding a title to each version of the composite video of the scene, and saving the edited versions of the composite video of the scene.

23. The system of claim 12, the video generating application further comprises computer implemented instructions for entering one or more of a company logo, company name, company image, and company contact information.

24. The system of claim 12, wherein the mobile communication device comprises one of a tablet, a digital camera, a mobile phone, a laptop computer, a drone, or any other computing device with a camera.

* * * * *